United States Patent [19]
Sekine et al.

[11] Patent Number: 6,130,966
[45] Date of Patent: *Oct. 10, 2000

[54] IMAGE PROCESSING SYSTEM AND METHOD FOR CONVERTING AN INPUT N-VALUED (N>OR-Z) IMAGE INTO AN M-VALUED (M>N) IMAGE

[75] Inventors: Hiroshi Sekine; Kunikazu Ueno, both of Ebina, Japan

[73] Assignee: Fuji Xerox Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/751,623

[22] Filed: Nov. 18, 1996

[30] Foreign Application Priority Data

Nov. 17, 1995 [JP] Japan .................... 7-299834

[51] Int. Cl.$^7$ ..................................... G06K 9/32
[52] U.S. Cl. ..................... 382/299; 382/199; 382/237; 382/254; 382/258; 382/259; 382/293; 382/298; 382/300; 382/304; 382/455; 382/262.1; 345/132; 358/448; 358/451
[58] Field of Search ..................... 382/298, 299, 382/293, 199, 304, 254, 237, 262.1, 258, 259, 455, 300; 345/132; 358/451, 448

[56] References Cited

U.S. PATENT DOCUMENTS

| | | | |
|---|---|---|---|
| 4,068,266 | 1/1978 | Liao | 358/140 |
| 4,742,553 | 5/1988 | Irwin | 382/27 |
| 4,827,352 | 5/1989 | Yoneda et al. | 358/280 |
| 5,245,444 | 9/1993 | Hashimoto | 358/445 |
| 5,454,052 | 9/1995 | Kojima | 382/54 |
| 5,579,445 | 11/1996 | Loce et al. | 395/102 |
| 5,661,824 | 8/1997 | Allebach et al. | 382/298 |
| 5,687,297 | 11/1997 | Coonan et al. | 395/102 |
| 5,689,343 | 11/1997 | Loce et al. | 358/296 |
| 5,704,019 | 12/1997 | Akiyama et al. | 395/101 |

FOREIGN PATENT DOCUMENTS

| | | |
|---|---|---|
| 61-288567 | 12/1986 | Japan . |
| 63-13579 | 1/1988 | Japan . |
| 2-76370 | 3/1990 | Japan . |
| 5-143726 | 6/1993 | Japan . |
| 5-160996 | 6/1993 | Japan . |
| 5-344340 | 12/1993 | Japan . |

*Primary Examiner*—Matthew Bella
*Assistant Examiner*—Sheela Chawan
*Attorney, Agent, or Firm*—Oliff & Berridge, PLC

[57] ABSTRACT

A facsimile apparatus contains transfer modes such as a standard mode, a fine image quality mode, a super fine image quality mode which are different from one another in resolution. A signal representing each transfer mode is transmitted from the transmission side to the reception side before the transmission and reception of facsimile image data. A control unit detects the resolution of reception data according to the transfer mode signal to switch over methods for conversion into high-tone in a high-tone conversion unit or to set the magnification of conversion of a resolution conversion unit according to the detected resolution. In this case, when high resolution is detected, the unit for conversion into high-tone executes conversion into multi-value using an area of 17×17 picture elements around candidate picture elements for processing. When low resolution is detected, the unit executes the conversion into multi-value using an area of 11×11 picture elements around the candidate picture elements for processing.

14 Claims, 28 Drawing Sheets

FIG. 9 (a)
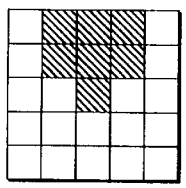
FIRST AREA PATTERN
FIG. 9 (b)
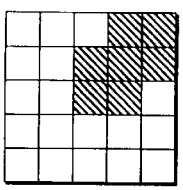
SECOND AREA PATTERN
FIG. 9 (c)
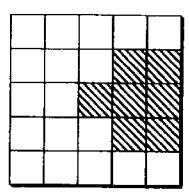
THIRD AREA PATTERN
FIG. 9 (d)
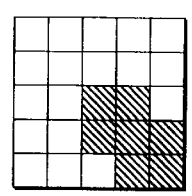
FOURTH AREA PATTERN
FIG. 9 (e)
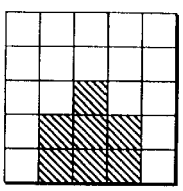
FIFTH AREA PATTERN
FIG. 9 (f)
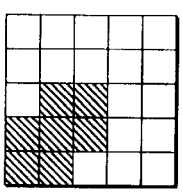
SIXTH AREA PATTERN
FIG. 9 (g)
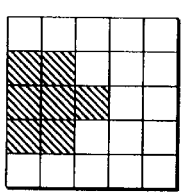
SEVENTH AREA PATTERN
FIG. 9 (h)
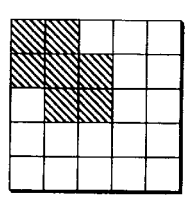
EIGHTH AREA PATTERN
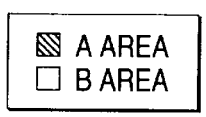
FIG. 10
| 1 | 3 | 5 | 3 | 1 |
|---|---|---|---|---|
| 3 | 5 | 7 | 5 | 3 |
| 5 | 7 | 9 | 7 | 5 |
| 3 | 5 | 7 | 5 | 3 |
| 1 | 3 | 5 | 3 | 1 |

FIRST AREA PATTERN

SECOND AREA PATTERN

THIRD AREA PATTERN

FOURTH AREA PATTERN

FIFTH AREA PATTERN

SIXTH AREA PATTERN

SEVENTH AREA PATTERN

EIGHTH AREA PATTERN

FIRST AREA PATTERN

SECOND AREA PATTERN

THIRD AREA PATTERN

FOURTH AREA PATTERN

FIFTH AREA PATTERN

SIXTH AREA PATTERN

SEVENTH AREA PATTERN

EIGHTH AREA PATTERN

FIG. 20 (a)
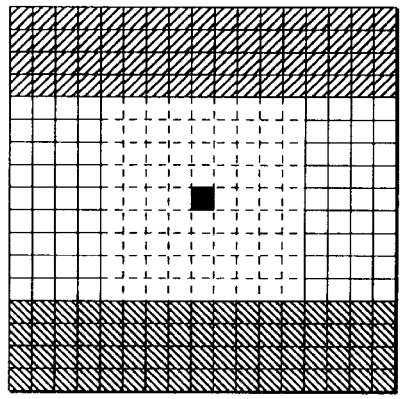
FILTER FOR FINDING EDGE INTENSITY $G_1$
FIG. 20 (b)
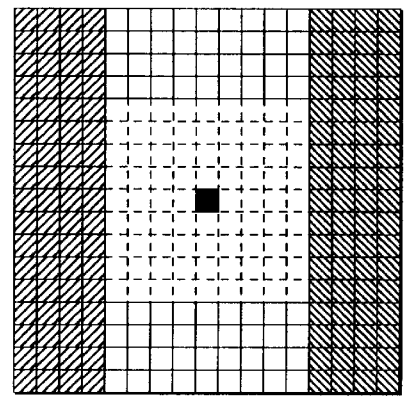
FILTER FOR FINDING EDGE INTENSITY $G_2$
FIG. 20 (c)
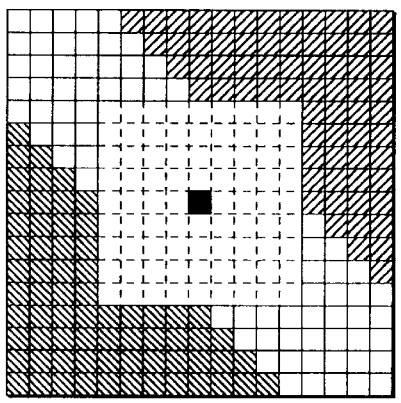
FILTER FOR FINDING EDGE INTENSITY $G_3$
FIG. 20 (d)
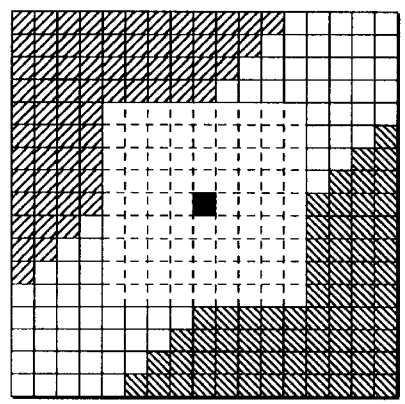
FILTER FOR FINDING EDGE INTENSITY $G_4$
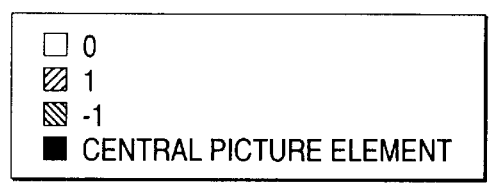
□ 0
▨ 1
▧ -1
■ CENTRAL PICTURE ELEMENT

FIG. 21 (a)
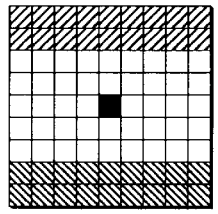
FILTER FOR FINDING EDGE INTENSITY $G_{11}$
FIG. 21 (b)
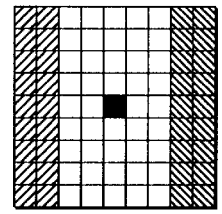
FILTER FOR FINDING EDGE INTENSITY $G_{12}$
FIG. 21 (c)
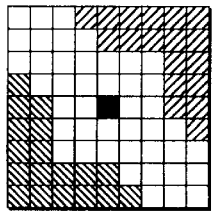
FILTER FOR FINDING EDGE INTENSITY $G_{13}$
FIG. 21 (d)
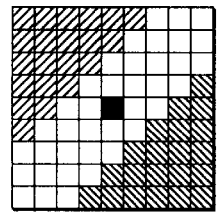
FILTER FOR FINDING EDGE INTENSITY $G_{14}$
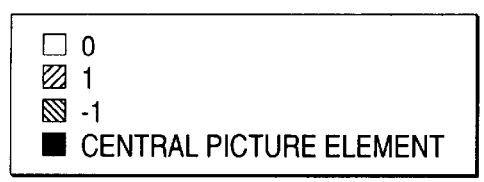

FIG. 23
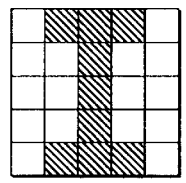
FIG. 24 (a)　　FIG. 24 (b)　　FIG. 24 (c)　　FIG. 24 (d)
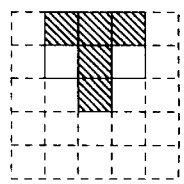　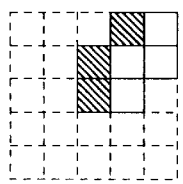　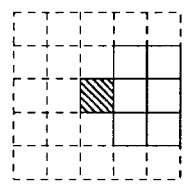　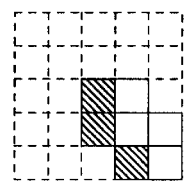
FIRST AREA PATTERN　　SECOND AREA PATTERN　　THIRD AREA PATTERN　　FOURTH AREA PATTERN
FIG. 24 (e)　　FIG. 24 (f)　　FIG. 24 (g)　　FIG. 24 (h)
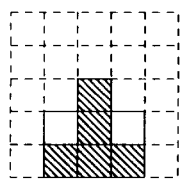　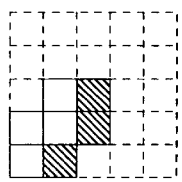　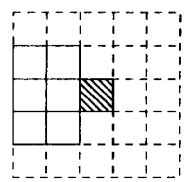　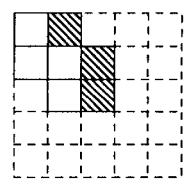
FIFTH AREA PATTERN　　SIXTH AREA PATTERN　　SEVENTH AREA PATTERN　　EIGHTH AREA PATTERN

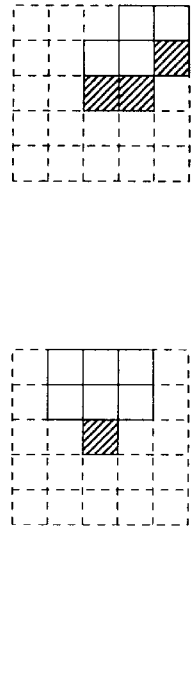
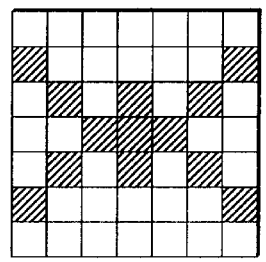
FIG. 27 (a) FIRST AREA PATTERN
FIG. 27 (b) SECOND AREA PATTERN
FIG. 27 (c) THIRD AREA PATTERN
FIG. 27 (d) FOURTH AREA PATTERN
FIG. 27 (e) FIFTH AREA PATTERN
FIG. 27 (f) SIXTH AREA PATTERN
FIG. 27 (g) SEVENTH AREA PATTERN
FIG. 27 (h) EIGHTH AREA PATTERN
FIG. 27 (i) NINTH AREA PATTERN
FIG. 28

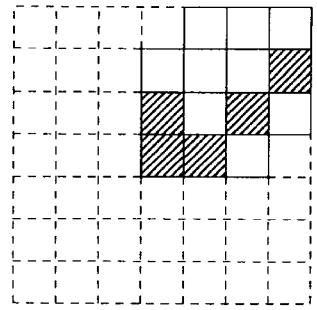
FIG. 29 (d) FOURTH AREA PATTERN
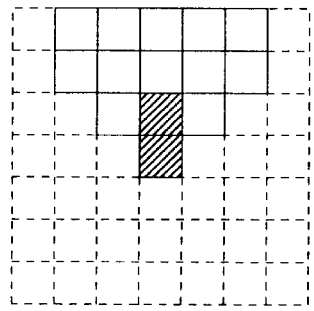
FIG. 29 (c) THIRD AREA PATTERN
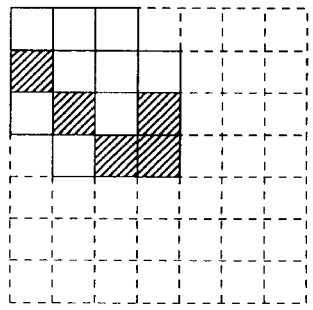
FIG. 29 (b) SECOND AREA PATTERN
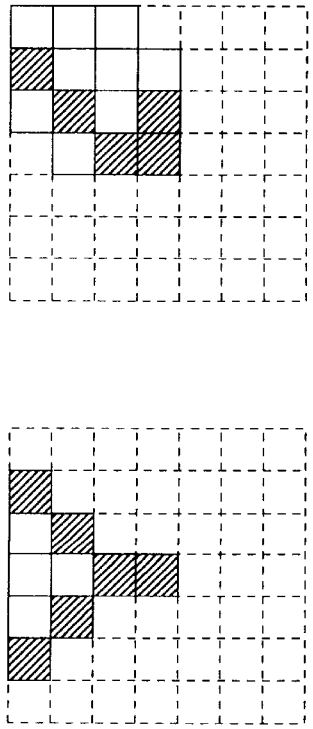
FIG. 29 (a) FIRST AREA PATTERN
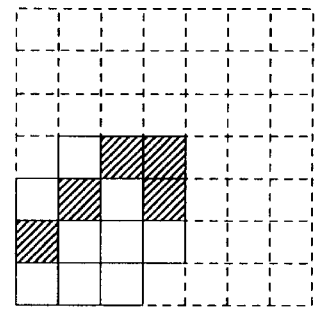
FIG. 29 (h) EIGHTH AREA PATTERN
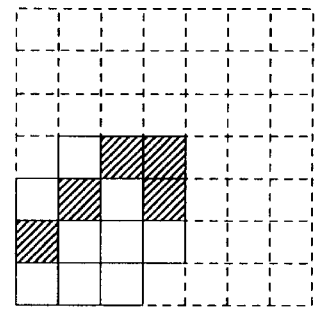
FIG. 29 (g) SEVENTH AREA PATTERN
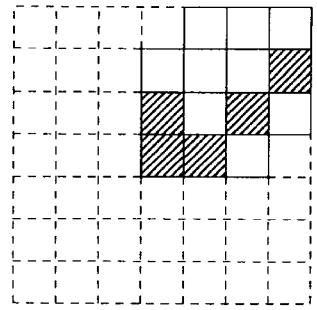
FIG. 29 (f) SIXTH AREA PATTERN
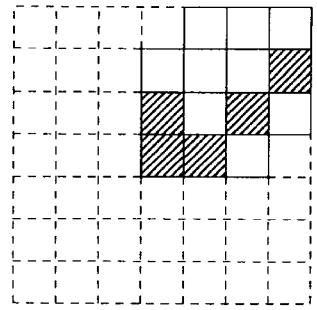
FIG. 29 (e) FIFTH AREA PATTERN

FIRST AREA PATTERN

SECOND AREA PATTERN

THIRD AREA PATTERN

FOURTH AREA PATTERN

FIFTH AREA PATTERN

SIXTH AREA PATTERN

SEVENTH AREA PATTERN

EIGHTH AREA PATTERN

☒ CENTRAL PICTURE ELEMENT

☒ CENTRAL PICTURE ELEMENT

6,130,966

IMAGE PROCESSING SYSTEM AND METHOD FOR CONVERTING AN INPUT N-VALUED (N>OR-Z) IMAGE INTO AN M-VALUED (M>N) IMAGE

BACKGROUND OF THE INVENTION

1. Field of the Invention

This invention relates to an image processing system and an image processing system suitably used for a digital copying machine, a digital image recording apparatus or the like.

2. Description of the Related Art

Conventionally, a device for conversion into multi-value to convert a low-tone image (i.e., N-valued image) into a high-tone image (i.e., M-valued image, N<M) has been well known. For example, there has been provided a device for converting a binary image into a multi-valued image.

In case of varying the magnification (conversion of resolution) of an N-valued image, the N-valued image has been once converted into a multi-valued image using the device for conversion into multi-value. In addition to the above case, the device for conversion into multi-value has been used when a binary image is converted into a multi-valued image of high quality for outputting like a case of FAX, or when the binary image is compressed with binary data for storing, and then restored and converted into a multi-valued image when outputting.

Various techniques for conversion into multi-value have been developed heretofore and can be generally classified into four groups as follows.

(1) Method of using a simple smoothing process for conversion into multi-value (See Unexamined Japanese Patent Publication (kokai) Nos. 63-013579, and 5-160996 or the like)

(2) Method of converting an image into a binary image using a systematic dither process, and subsequently estimating an original intermediate-tone image (i.e., multi-valued image) in the binary image using dither matrix having been used at the time of conversion into the binary image (Unexamined Japanese Patent Publication (kokai) No. 61-288567 or the like)

(3) Method of detecting brightness (i.e., number of black picture elements) within a certain area and then appropriately switching over the size of a filter for conversion into multi-value according to the detected brightness (Unexamined Japanese Patent Publication (kokai) No. 2-76370 or the like)

(4) Method of detecting intensity and direction of an edge and then appropriately switching over the size, shape or coefficient of a filter for conversion into multi-value according to the detected intensity and direction (Unexamined Japanese Patent Publication Nos. 5-143726 and 5-344340 or the like)

According to the above conventional art, an area of a predetermined size containing a specific picture element (i.e., a candidate picture element for processing) has been set for an input image of low tone. Subsequently, an image of high tone has been estimated according to a picture element value in the predetermined area.

However, in the above conventional art, a device for conversion into multi-value has been used without variation, irrespective of the resolution of an input image. Thus, inappropriate conversion into multi-value has been caused in some cases.

SUMMARY OF THE INVENTION

It is an object of the present invention to provide an image processing system which can execute conversion into multi-value according to the spatial resolution of an input image.

An image processing system according to the present invention comprises: a plurality of converting units for converting an input N-valued (N≧2) image into an M-valued (M>N) image; a recognizing unit for recognizing a spatial resolution of said input N-valued image; and a selecting unit for selecting one of said converting unit according to the spatial resolution recognized by said recognizing unit.

Further, an image processing system according to the present invention comprises: a converting unit for converting an input N-valued (N≧2) image into an M-valued (M>N) image; a recognizing unit for recognizing the spatial resolution of said input N-valued image; a variable magnification unit for varying the magnification of an image; and a variable magnification control unit for varying the magnification of said input N-valued image with said variable magnification unit when the spatial resolution recognized by said recognizing unit is not more than a predetermined value, while varying the magnification of the M-valued image, which is outputted from said converting unit, with said variable magnification unit when the spatial resolution recognized by said recognizing unit exceeds the predetermined value.

An image processing method according to the present invention comprises the steps of: inputting an input N-valued (N≧2) image; recognizing a spatial resolution of the input N-valued image; selecting one of a plurality of converting means for converting the input N-valued image into an M-valued (M>N) image; and converting the input N-valued image into the M-valued image by the selected converting means.

According to the present invention, it is possible to convert the input N-valued image into the M-valued image according to the spatial resolution.

According to the present invention, it is possible to vary the magnification (conversion of spatial resolution) according to an image output unit (i.e., a printer or the like). Besides, when the spatial resolution is recognized to be low, the input N-valued image is not converted into the M-valued image, and the magnification of the input N-valued image itself is varied. Thus, the inappropriate conversion into the M-valued image is not performed to prevent deterioration of an image.

BRIEF DESCRIPTION OF THE DRAWINGS

In the accompanying drawings:

FIG. 9 is a view showing a filter for use in a process of converting a low frequency edge portion into a multi-value in the image processing system;

FIG. 10 is a filter for use in a third circuit for conversion into multi-value in the image processing system;

FIG. 20 is a view showing a filter for use in a first highlighted edge detection circuit in the image processing system;

FIG. 21 is a view showing a filter for use in a second highlighted edge detection circuit in the image processing system;

FIG. 23 is a view showing an edge for explaining the operation of a high frequency edge detection filter;

FIG. 24 is a view showing a case of applying the filter shown in FIG. 16 to the edge shown in FIG. 23;

FIG. 27 is a view showing a case of applying the filter shown in FIG. 7 to the edge shown in FIG. 23;

FIG. 28 is a view showing an edge for explaining the operation of a low frequency edge detection filter;

FIG. 29 is a view showing a case of applying the filter shown in FIG. 7 to the edge shown in FIG. 28;

DETAILED DESCRIPTION OF THE INVENTION

A. Configuration in mode of embodiment (1) General configuration

Figure 1:
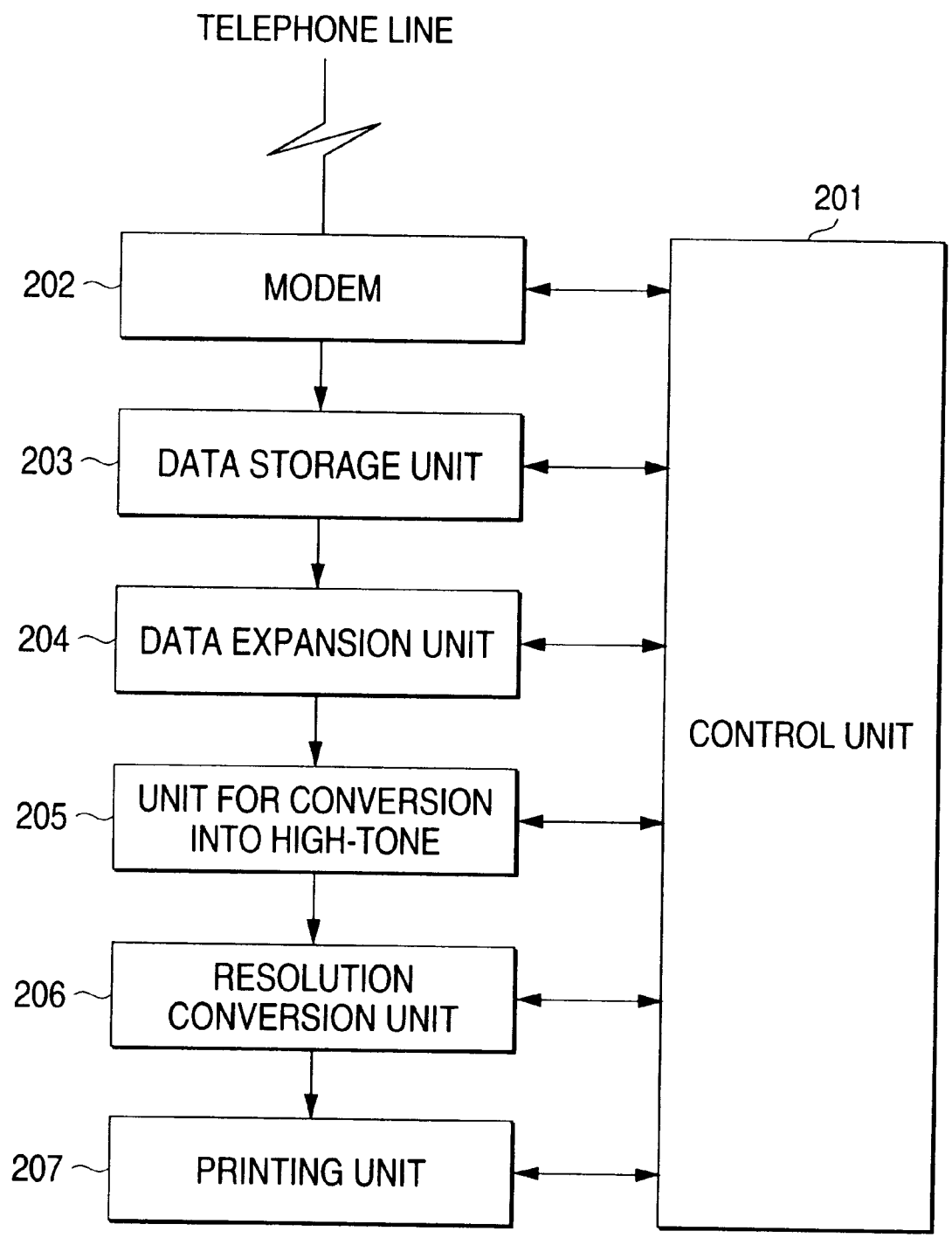
FIG. 1 is a block diagram showing the configuration of a mode of embodiment according to the present invention.

Hereinafter will be described a mode of embodiment according to the present invention with reference to the accompanying drawings. FIG. 1 is a block diagram showing the configuration of a facsimile apparatus as an embodiment of the present invention. In the drawing, reference numeral 202 designates a modem connected to a telephone line. The modem 202 receives facsimile data and transfers reception data to a data storage unit 203. A semiconductor memory, a magnetic disc or the like is used in general as a data storage device in the data storage unit 203. Data stored in the data storage unit 203 is transferred to a data expansion unit 204. The data expansion unit 204 expands the reception data which has been compressed for facsimile data transfer. Subsequently, a unit 205 for conversion into high-tone converts the received facsimile data (generally, the facsimile apparatus transfer binary data) expanded in the data expansion unit into multi-valued data. Incidentally, a method of conversion into multi-value will be specifically described later.

A resolution conversion unit 206 converts the multi-valued reception data into resolution suitable to a printing unit 207. In the meantime, a standard mode of G3 facsimile is set to be 8 dot/mm×3.85 dot/mm, and the spatial resolution in the range of approximately 400 dpi (i.e., 400 picture elements per inch) to 600 dpi (i.e., 600 picture elements per inch) is generally required for a laser printer or the like. Since a demand for higher resolution in a printer unit is expected in the future, higher density is demanded for the conversion of resolution in most cases. A resolution conversion method is not the main object of the present invention, and therefore, the detailed description thereof will be omitted. However, since the reception data is converted into multi-valued data, it is possible to use a generally-known resolution conversion method such as a three-dimensional convoluted interpolation and a bilinear method. The multi-valued reception data is converted into the resolution for printing, and subsequently printed to a sheet in a printing unit 207.

Figure 3:
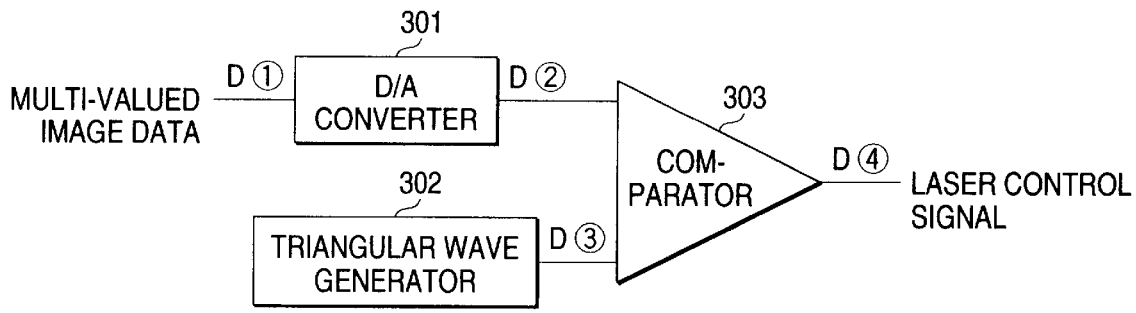
FIG. 3 is a block diagram showing the configuration of a multi-value printing circuit in case of using a laser printer for a printing unit.

A description will now be given of a multi-valued printing method in the case of using a laser printer for the printing unit 207 with reference to FIG. 3. In FIG. 3, multi-valued reception data D(1) is converted into the resolution for printing, and subsequently converted into analog data D(2) in a D/A converter 301. An analog reference wave D(3) is outputted from a triangular wave generator 302. Then, the analog data D(2) is compared with the analog reference wave D(3) by a comparator 303 to create a laser control signal D(4).

Figure 4:
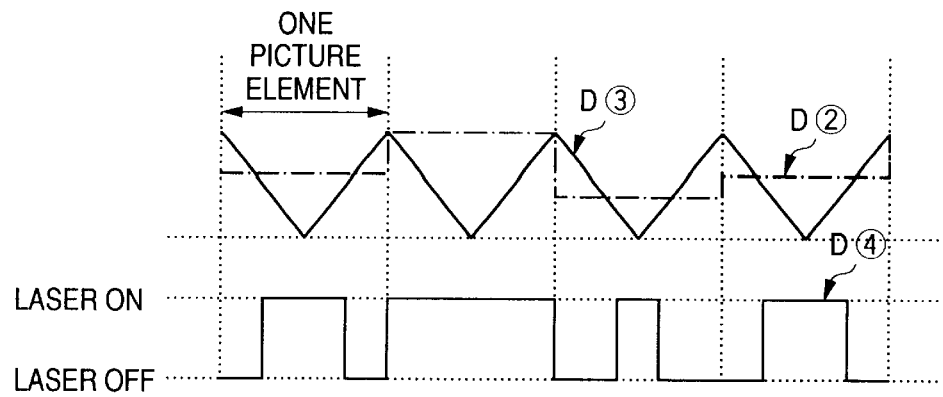
FIG. 4 is a waveform diagram showing the waveform of various portions in the circuit shown in FIG. 3.

FIG. 4 shows an embodiment of a change of each data described above. As is apparent from FIG. 4, when a value of the analog data D(2) is greater than the analog reference wave D(3), a laser is turned on. On the other hand, when a value of the analog data D(2) is smaller than the analog reference wave D(3), the laser is turned off. A laser signal controlled as described above is irradiated to a photosensitive medium (not shown), and toner is attached to a position irradiated with a laser beam. Subsequently, the toner attached to the photosensitive medium is transferred to sheet and fixed thereto, and finally, the toner image is outputted.

The modem 202, the data storage unit 203, the data expansion unit 204, the unit 205 for conversion into high-tone, the resolution conversion unit 206 and the printing unit 207 are all connected to a control unit 201, which controls the timing or the like of transfer of data between the respective units.

A standard mode, a fine image quality mode, a super fine image quality mode or like transfer modes different from one another in resolution are set in the facsimile apparatus. A signal representing each transfer mode is transmitted from the transmission side to the reception side before the transmission and reception of facsimile image data. Then, the control unit 201 detects the spatial resolution of reception data according to the transfer mode signal to switch over a method of conversion into high-tone in the unit 205 for conversion into high-tone or set the magnification for conversion in the resolution conversion unit 206 according to the detected spatial resolution.

According to the method of converting an image into a high-tone image, a high-tone converted value of a picture element for conversion is estimated on the basis of a plurality of picture element values within a certain area around the candidate picture element for conversion, in most cases. In the present invention, the size of the certain area is switched over according to the spatial resolution of the input image.

Figure 2:
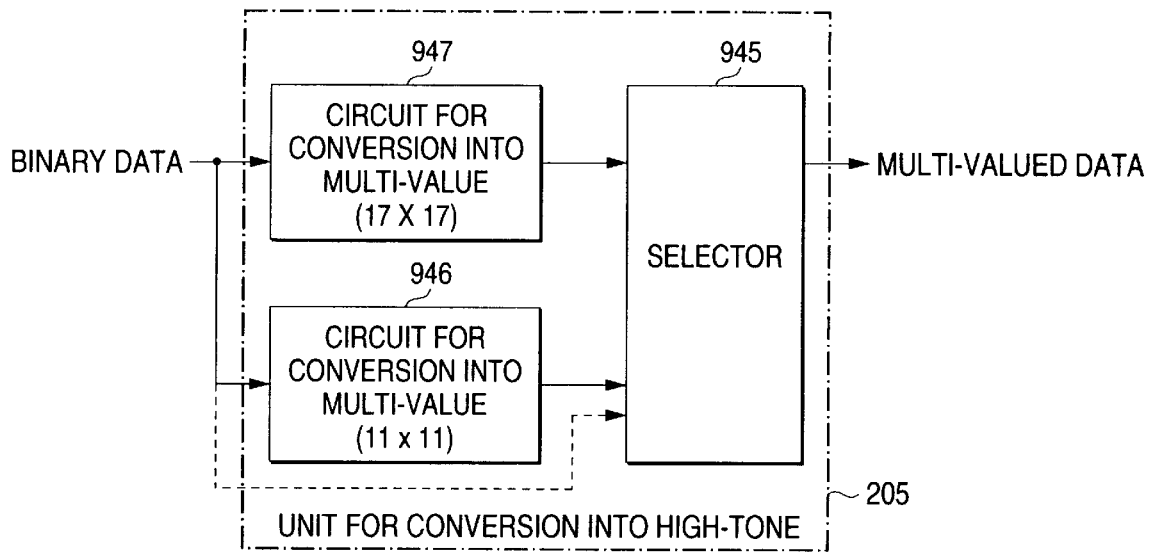
FIG. 2 is a block diagram showing the configuration of a unit for conversion into high-tone shown in FIG. 1.

Namely, as shown in FIG. 2, the unit 205 for conversion into high-tone includes a circuit 947 for conversion into multi-value using an area of 17×17 picture elements (incidentally, in the facsimile apparatus, conversion of binary data into multi-valued data results in conversion into high-tone), and a circuit 946 for conversion into multi-value using an area of 11×11 picture elements. When the transfer mode of reception data is a standard mode (i.e., 8 dot/mm× 3.85 dot/mm), conversion into multi-value is performed in the area of 11×11 picture elements. On the other hand, when the transfer mode of reception data is the fine image quality mode (i.e., 8 dot/mm×7.7 dot/mm), the conversion into multi-value is performed in the area of 17×17 picture elements. Subsequently, a signal corresponding to the resolution is selectively outputted from a selector 945.

Otherwise, it is possible to switch over a process of conversion into multi-value such that conversion into multi-value is performed only in the high resolution mode, while no conversion into multi-value is performed in the standard mode. Namely, in the standard mode, the selector 945 selects a route shown by a broken line in FIG. 2 to output the input binary data through the route to the resolution conversion unit 206 as it is.

It is preferable that the size of an area for conversion into higher resolution is set to be smaller accordingly as the spatial resolution is lowered, or that no conversion into high-tone is performed when the resolution is not more than a predetermined value. Thus, a plurality of circuits for conversion into multi-value are provided, while the areas for conversion into multi-value are appropriately varied from each other. Then, the circuit for conversion into multi-value is selected such that the area for conversion into multi-value is smaller according as the resolution is lowered. Further, when the spatial resolution is not more than a predetermined value, the route shown by the broken line in FIG. 2 may be selected to perform no conversion into multi-value (i.e., conversion into high-tone).

(2) Configuration of circuit 947 for conversion into multi-value

A description will now be given of conversion into multi-value in the circuit 947 in case where N=2 and M=256, as an embodiment of conversion of an N-valued image into an M-valued image (M>N).

Figure 5:
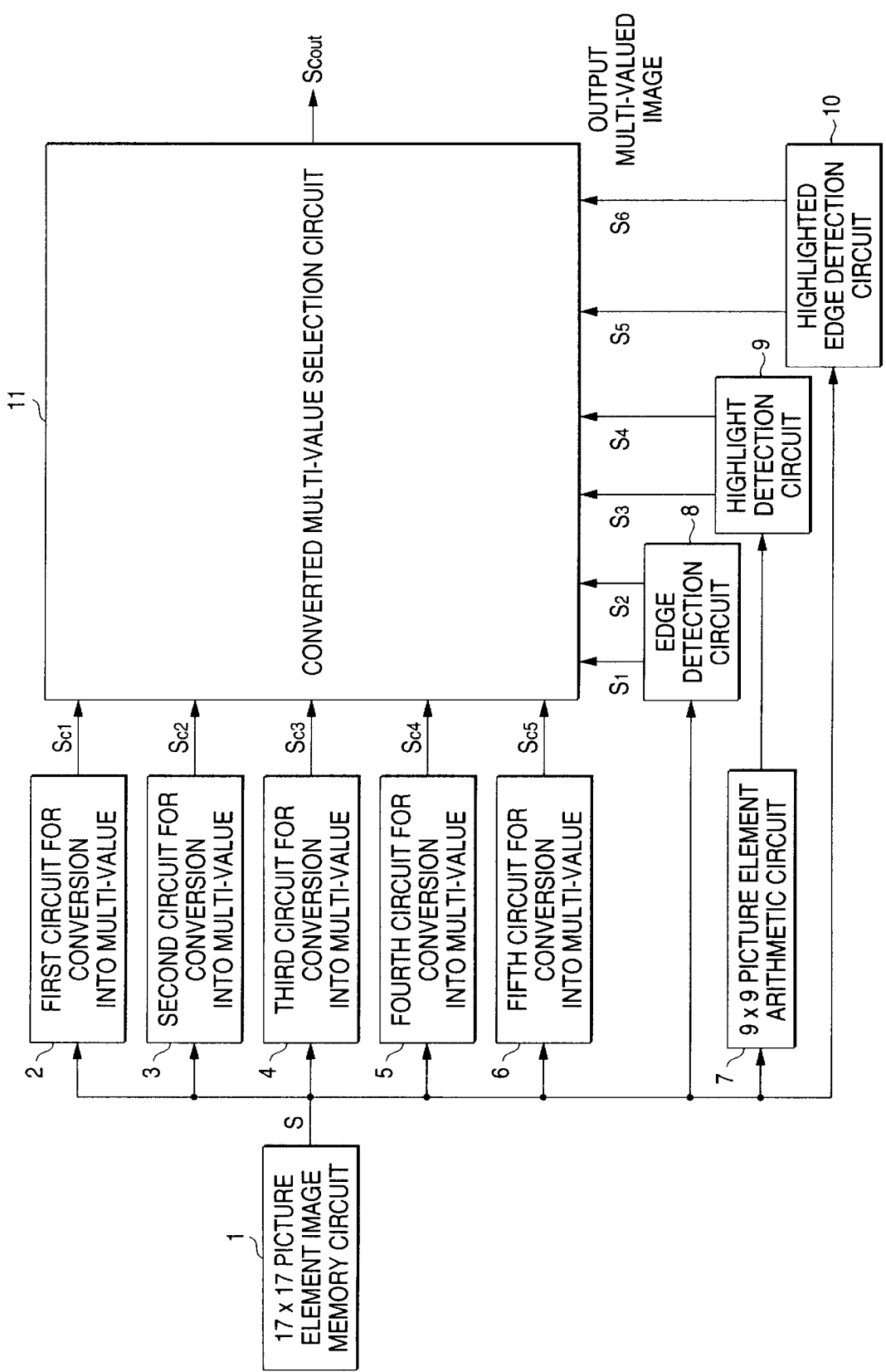
FIG. 5 is a block diagram showing the configuration of a circuit for conversion into multi-value.

FIG. 5 is a block diagram showing the configuration of the circuit 947 for conversion into multi-value using the area of 17×17 picture elements as described above. In FIG. 5, input binary image data of a portion corresponding to 17×17 picture elements around a central picture element for processing is stored in an image memory circuit 1. Subsequently, the image data stored in the image memory circuit 1 is operated for conversion into multi-value with each of first to fifth circuits 2 to 6 for conversion into multi-value as shown in FIG. 5. The first to fifth circuits for conversion into multi-value are different from one other in arithmetic operating method. A converted multi-value selection circuit 11 arranged on the post stage selects an optimum value among values operated in the first to fifth circuits for conversion into multi-value. The individual circuits for conversion into multi-value perform operation for conversion into multi-value with respect to images having different characteristics as follows.

first circuit 2 for conversion into multi-value: image having high frequency edge portion second circuit 3 for conversion into multi-value: image having low frequency edge portion third circuit 4 for conversion into multi-value: image having intermediate density portion and highlighted edge portion fourth circuit 5 for conversion into multi-value: image having highlighted non-edge portion fifth circuit 6 for conversion into multi-value: image having most highlighted non-edge portion which is an extremely bright portion In this case, the high frequency edge represents a portion marked with a sharp change of density, and the low frequency edge represents a portion marked with a gentle change of density. In general, the former is detected in a relatively small area, and the latter is detected in a relatively large area. A description will be now given of each circuit for conversion into multi-value.

a: First circuit 2 for conversion into multi-value

Figure 6:
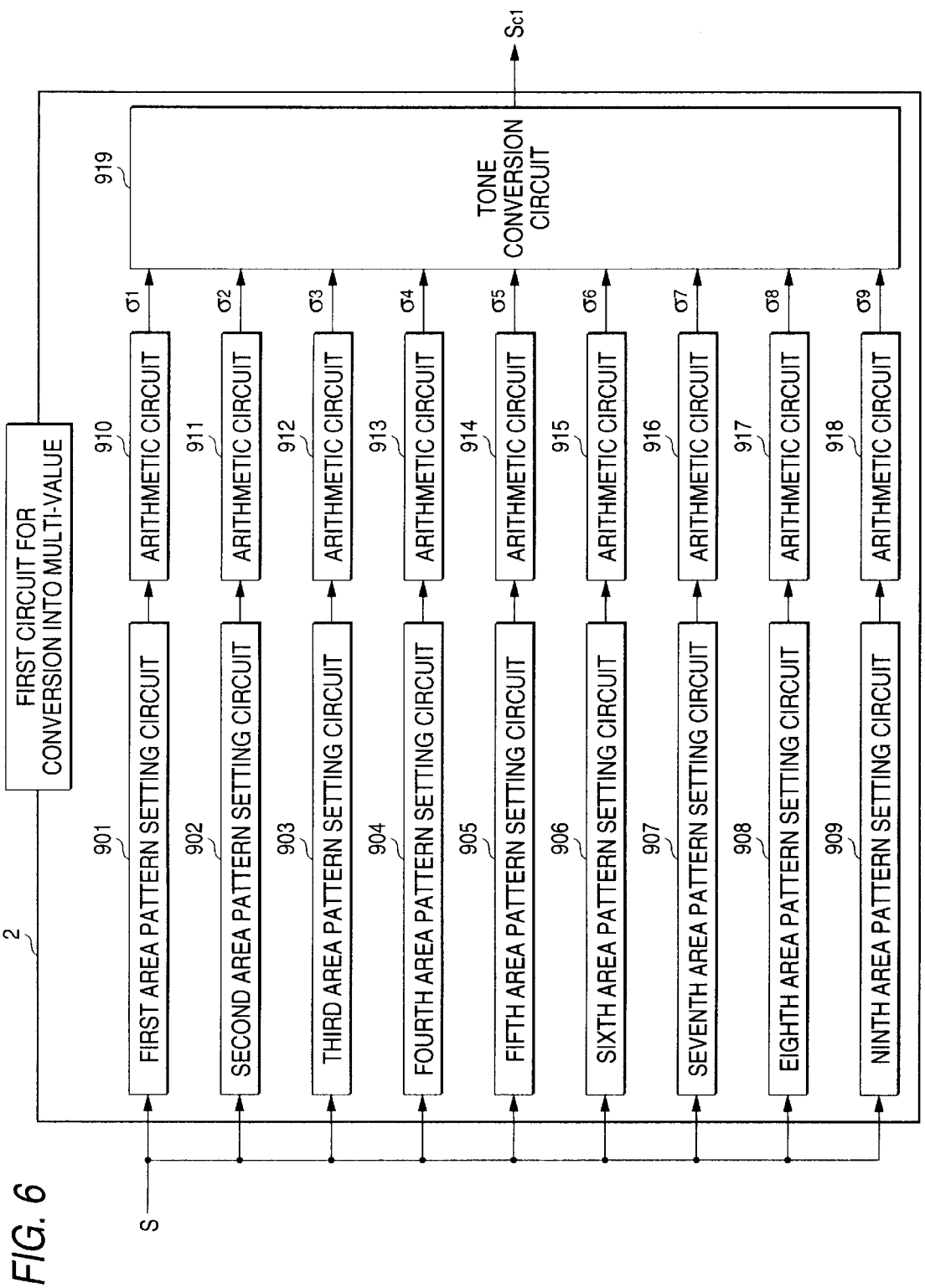
FIG. 6 is a schematic view showing the configuration of a first circuit for conversion into multi-value in an image processing system.

The first circuit 2 for conversion into multi-value converts a high frequency edge portion into a multi-value and has a configuration as shown in FIG. 6. Firstly, image data S outputted from the image memory circuit 1 is inputted to first to ninth area pattern setting circuits 901 to 909.

A filter pattern shown in FIG. 7(a) is stored in the first area pattern setting circuit 901. Subsequently, an arithmetic circuit 910 shown in FIG. 6 calculates a variance of picture elements contained in an area of the filter pattern. The resultant variance σ1 is inputted to a tone conversion circuit 919. Similarly, filter patterns shown in FIGS. 7(b) to 7(i) are respectively stored in the second to ninth area pattern setting circuits 902 to 909, and arithmetic circuits 911 to 918 arranged on the post stage of the second to ninth area pattern setting circuits respectively calculate variances σ1 to σ9 of the picture elements within the respective area patterns. Each variance calculated in this manner is inputted to the tone conversion circuit 919. The tone conversion circuit 919 finds the maximum value among the inputted variances σ1 to σ9, calculates an average density value of the picture elements contained in the area pattern corresponding to the maximum variance and then outputs a converted multi-value Sc1.

In this manner, areas diverging in the different directions centering around the candidate picture element for processing are set as area patterns, and variances within the area patterns are calculated. Then, the average density of the area decided to have the maximum variance is outputted as a converted multi-value Sc1. In this case, the area pattern decided to have the maximum variance represents an area pattern marked with a wide dispersion of picture elements, and also corresponds to a non-edge portion. With respect to such an area marked with a wide dispersion of picture elements, when a central picture element for processing corresponds to an edge portion, the edge portion can be converted into a multi-value without obscuration, as long as the average density value of the respective picture elements is calculated. Accordingly, it is suitable to convert a sharp edge (i.e., high frequency edge) portion like a character and a line image into a multi-value.

b: Second circuit 3 for conversion into multi-value

Figure 8:
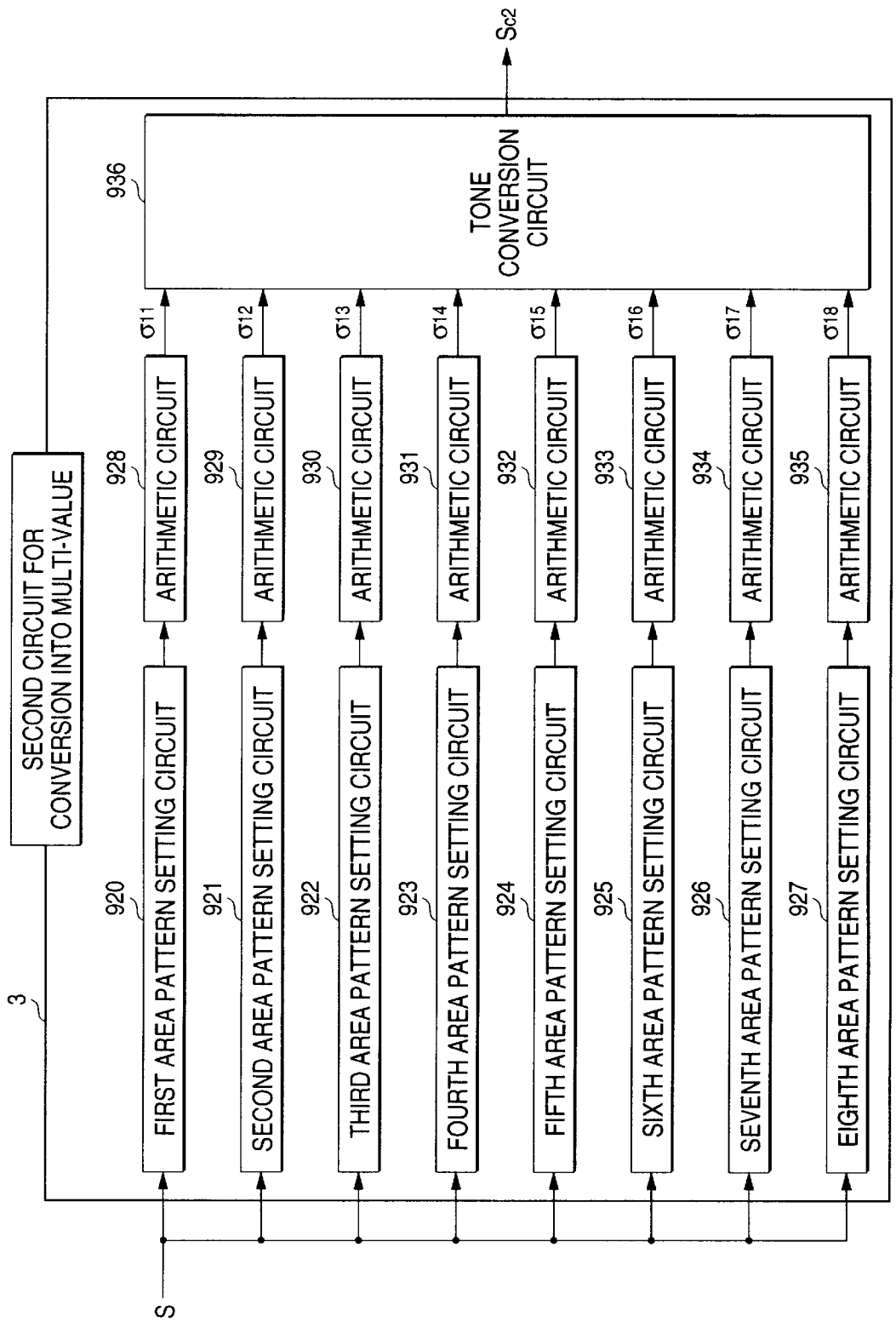
FIG. 8 is a block diagram showing a second circuit for conversion into multi-value in the image processing system.

The second circuit 3 for conversion into multi-value converts a low frequency edge component frequently contained in a pseudo intermediate tone portion into a multi-value and has a configuration as shown in FIG. 8. Basically, the second circuit 3 for conversion into multi-value is similar in operation to the first circuit 2 for conversion into multi-value.

Firstly, the image data S outputted from the image memory circuit 1 is inputted to first to eighth area pattern setting circuits 920 to 927. Area filter patterns (a) to (h) shown in FIG. 9 are respectively stored in the first to eighth area pattern setting circuits 920 to 927. Arithmetic circuits 928 to 935 arranged on the post stage of the first to eighth area pattern setting circuits respectively calculate variances σ11 to σ18 for the respective set area patterns. These variances σ11 to σ18 are inputted to a tone conversion circuit 936 shown in FIG. 8. The tone conversion circuit 936 finds the maximum value among the inputted variances σ11 to σ18, and searches the area pattern corresponding to the maximum variance. Subsequently, the tone conversion circuit 936 calculates an average density value using picture elements contained in a non-area portion of the searched area pattern, i.e., a B area shown in FIG. 9 (i.e., a portion without hatching: an area which does not serve for calculation of variance), and outputs the calculated average density value as a converted multi-value Sc2. As described above, the second circuit 3 for conversion into multi-value converts the low frequency edge portion into a multi-value by performing operation for the picture elements within the B area (i.e., an area wider than the A area), without regard for picture elements in an area decided to have the maximum variance, i.e., an area judged to increase an error in number. By so doing, the low frequency edge portion marked with a gentle change of density can be converted into a multi-value with more accuracy by removing a factor in error and also by performing operation for picture elements in a wider area.

In the mode of embodiment described above, the operation for conversion is performed to the exclusion of picture elements of the area pattern decided to have the maximum variance. However, some areas can be selected in descending order of variance to exclude picture elements in the selected areas from the operation for conversion.

c: Third to fifth circuits for conversion into multi-value

A description will now be given of the third to fifth circuits 4 to 6 for conversion into multi-value. First of all, the third circuit 4 for conversion into multi-value converts an intermediate density portion and a highlighted edge portion into a multi-value. The fourth circuit 5 for conversion into multi-value converts a highlighted non-edge portion into a multi-value, and the fifth circuit 6 for conversion into multi-value converts a most highlighted non-edge portion into a multi-value. The respective circuits for conversion into multi-value execute filter operation using different filters.

A 5×5 matrix filter as shown in FIG. 10 is stored in a filter operation circuit 937 of the third circuit for conversion into multi-value. The filter operation is performed using this filter to output a resultant converted multi-value as Sc3. In this operation, each matrix value is multiplied by a value of an input picture element at a position corresponding to each matrix value to find the algebraic sum of the results of multiplication.

A filter operation circuit 938 of the fourth circuit for conversion into multi-value executes simple smoothing in an area of 9×9 picture elements, and outputs the resultant converted multi-value as Sc4.

Figure 11:
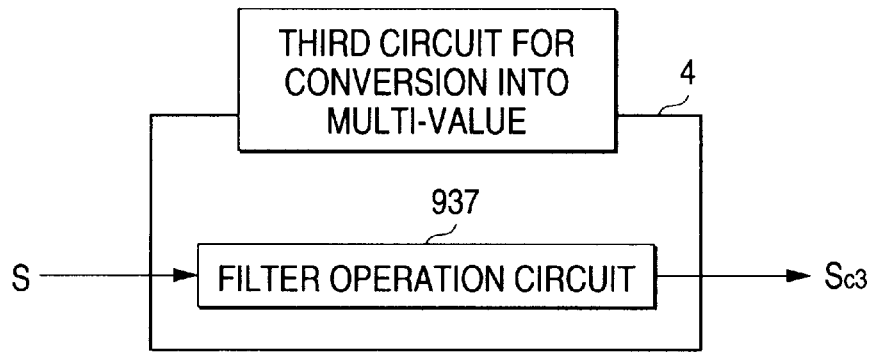
FIG. 11 is a block diagram showing the third circuit for conversion into multi-value in the image processing system.
Figure 12:
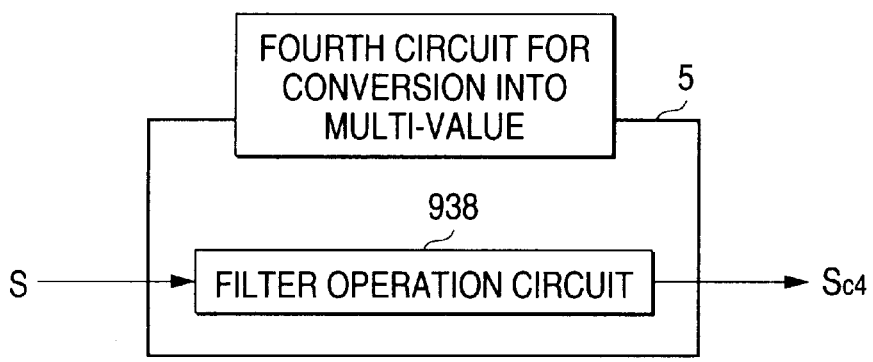
FIG. 12 is a block diagram showing a fourth circuit for conversion into multi-value in the image processing system.
Figure 13:
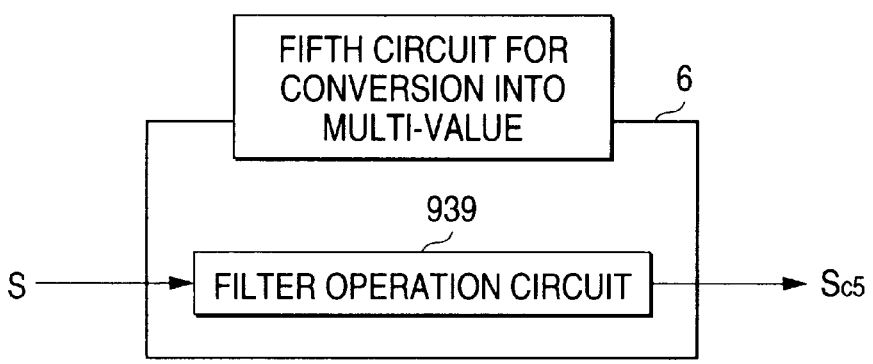
FIG. 13 is a block diagram showing a fifth circuit for conversion into multi-value in the image processing system.

Similarly, a filter operation circuit 939 of the fifth circuit for conversion into multi-value executes simple smoothing in an area of 17×17 picture elements and outputs the resultant converted multi-value as Sc5. FIGS. 11, 12 and 13 respectively show the configurations of the third to fifth circuits 4 to 6 for conversion into multi-value.

The signal values Sc1 to Sc5 obtained by the above processes are inputted to the converted multi-value selection circuit 11.

d: Edge detection circuit 8

Figure 14:
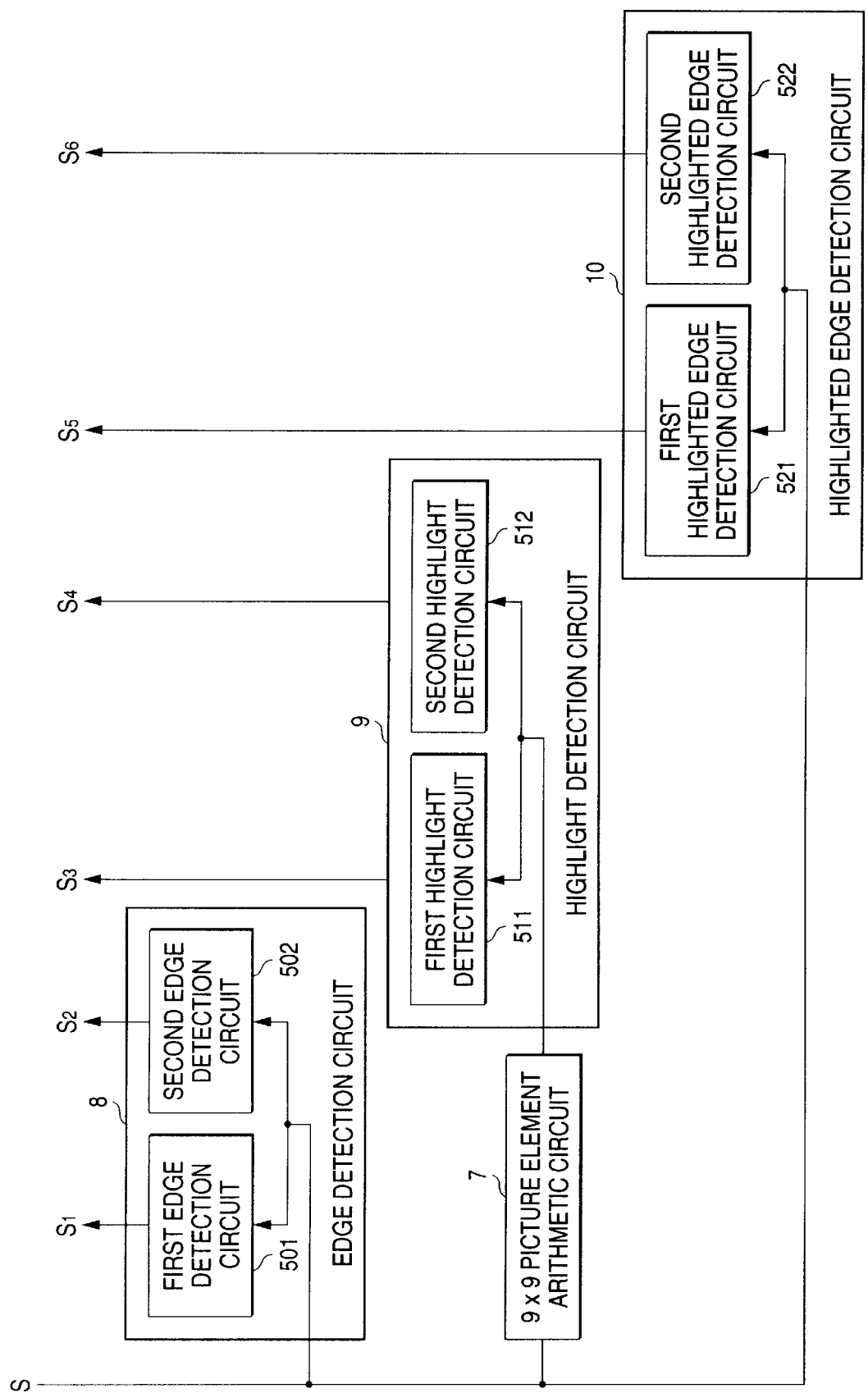
FIG. 14 is a block diagram showing an edge detection circuit, a highlight detection circuit and a highlighted edge detection circuit in the image processing system.
Figure 15:
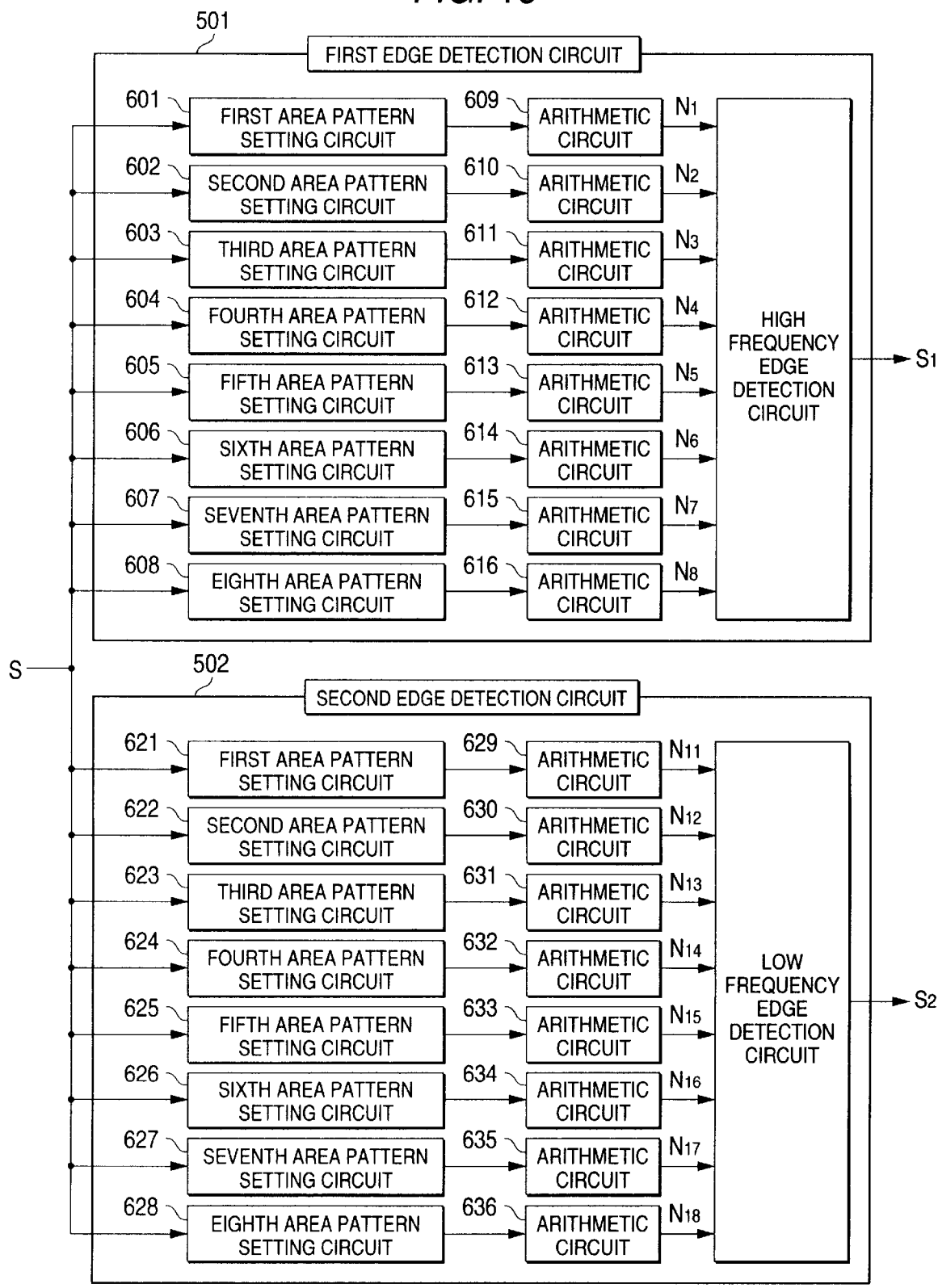
FIG. 15 is a block diagram showing the edge detection circuit in the image processing system.

A description will now be given of an edge detection circuit 8. The edge detection circuit 8 detects the edge of image data stored in the image memory circuit 1. As shown in FIG. 14, the edge detection circuit 8 includes a first edge detection circuit 501 and a second edge detection circuit 502. The first edge detection circuit 501 detects a high frequency edge component of an image, and the second edge detection circuit 502 detects a low frequency edge component of an image. Each of the first and second edge detection circuits 501 and 502 has the configuration as shown in FIG. 15.

Figure 16:
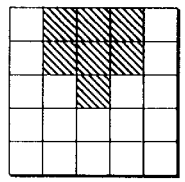
FIG. 16 is a block diagram showing a high frequency edge detection filter in the image processing system.
Figure 16:
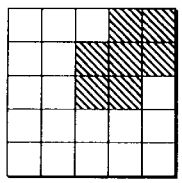
Figure 16:
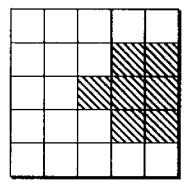
Figure 16:
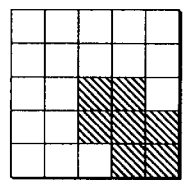
Figure 16:
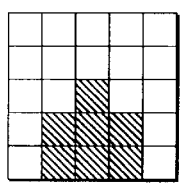
Figure 16:
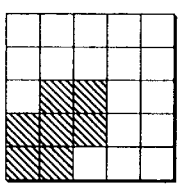
Figure 16:
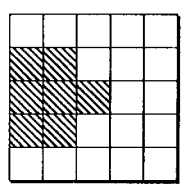
Figure 16:
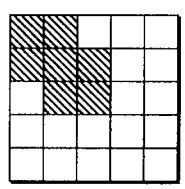

Firstly, a description will be given of the first edge detection circuit 501. As shown in FIG. 15, the first edge detection circuit 501 includes first to eighth area pattern setting circuits 601 to 608, arithmetic circuits 609 to 616 and a high frequency edge detection circuit 617. In this case, eight kinds of area patterns shown in FIG. 16 are respectively stored in the first to eighth area pattern setting circuits 601 to 608, and the arithmetic circuits 609 to 616 arranged on the next stage respectively calculate the numbers of black picture elements N1 to N8 contained in the corresponding area patterns. Subsequently, the high frequency edge detection circuit 617 finds the maximum and minimum values among the numbers of black picture elements N1 to N8 calculated in the arithmetic circuits 609 to 616, and then compares a difference value between the maximum and minimum values thus obtained with a predetermined threshold value Tg1 to judge a high frequency edge. Namely, when the difference value is not less than the threshold value Tg1, a change of density is recognized to be sharp. Thus, candidate picture elements for processing are judged to be a high frequency edge portion, and signal value S1 is outputted as "1". On the other hand, when the difference value is less than the threshold value Tg1, the candidate picture elements for processing are judged to be a non high frequency edge portion, and the signal value S1 is outputted as "0".

Figure 17:
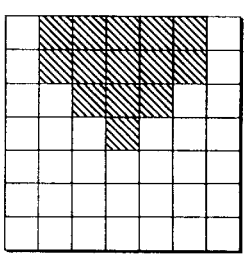
FIG. 17 is a view showing a low frequency edge detection filter in the image processing system.
Figure 17:
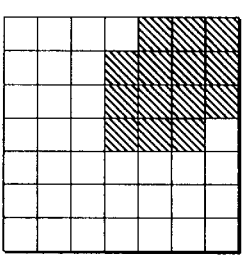
Figure 17:
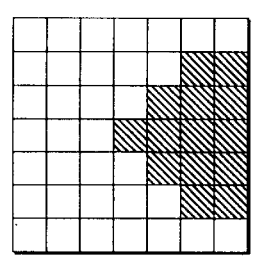
Figure 17:
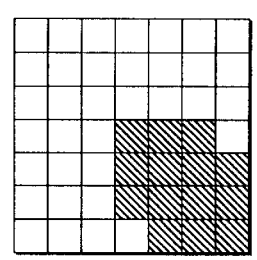
Figure 17:
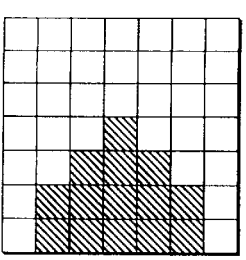
Figure 17:
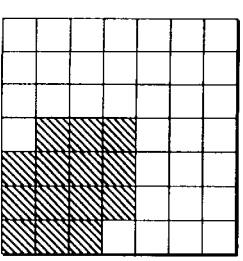
Figure 17:
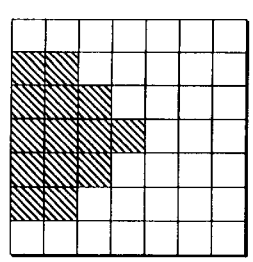
Figure 17:
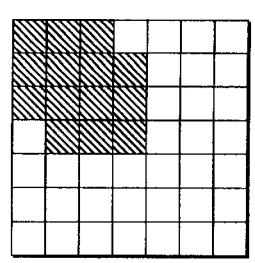

A description will now be given of the second edge detection circuit 502. The second edge detection circuit 502 is similar in configuration to the first edge detection circuit 501, except that the second edge detection circuit detects a low frequency edge of an image. FIG. 17 shows area patterns respectively stored in first to eighth area pattern setting circuits 621 to 628, and these area patterns are different in reference area from those in case of the first edge detection circuit. Arithmetic circuits 629 to 636 arranged on the next stage respectively calculate the numbers of black picture elements N11 to N18 contained in the corresponding area patterns. A low frequency edge detection circuit 637 finds the maximum and minimum values among the numbers of black picture elements N1 to N18 calculated in the arithmetic circuits 629 to 636, and executes operation for judgment on the basis of a difference value between the maximum and minimum values thus obtained, similarly to the first edge detection circuit 501. Namely, when the difference value is not less than a predetermined threshold value Tg2, candidate picture elements for processing are judged to be a low frequency edge portion, and a signal value S2 is outputted as "1". On the other hand, when the difference value is less than the threshold value Tg2, the candidate picture elements for processing are judged to be a non-low frequency edge portion, and the signal value S2 is outputted as "0". Subsequently, the signal values S1 and S2 obtained in the individual edge detection circuits are inputted to the converted multi-value selection circuit 11.

e: Highlight detection circuit

A description will now be given of a highlight detection circuit 9. The highlight detection circuit 9 judges as to whether or not image data stored in the image memory circuit 11 is a highlighted portion (i.e., as to whether or not image data is bright portion). As shown in FIG. 14, the highlight detection circuit 9 includes a first highlight detection circuit 511 and a second highlight detection circuit 512. The first highlight detection circuit 511 detects a most highlighted portion which is an extremely bright portion, and the second highlight detection circuit 512 detects a highlighted portion which is somewhat darker than the highlighted portion detected in the first highlight detection circuit 511.

Figure 18:
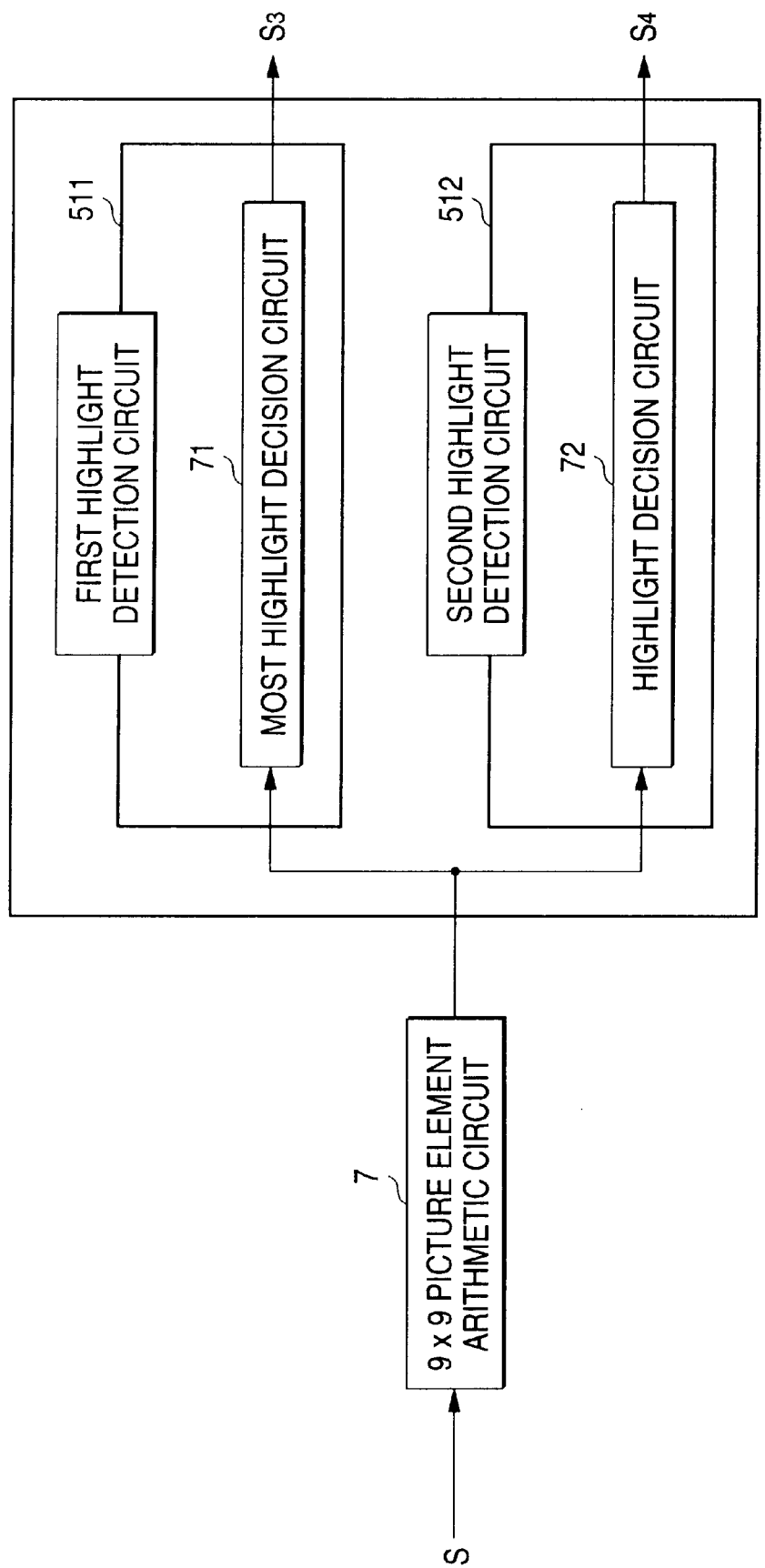
FIG. 18 is a block diagram showing the highlight detection circuit in the image processing system.

The first highlight detection circuit 511 has a most highlight decision circuit 71 (see FIG. 18), which judges as to whether or not the number of black picture elements calculated in a 9×9 picture element arithmetic circuit 7 arranged on the fore stage is not more than a predetermined threshold value Th1. When the number of black picture elements is not more than the threshold value Th1, candidate picture elements for processing are judged to be a most highlighted portion, and a signal value S3 is outputted as "1". On the other hand, when the number of black picture elements is greater than the threshold value Th1, the candidate picture elements for processing are judged to be a non-most highlighted portion, and the signal value S3 is outputted as "0".

The second highlight detection circuit 512 is similar in operation to the first highlight detection circuit 511. However, a threshold value Th2 for judging a highlighted portion is greater than the threshold value Th1, i.e., Th2>Th1. The second highlight detection circuit 512 has a highlight decision circuit 72 which judges as to whether or not the number of black picture elements calculated in the 9×9 picture element arithmetic circuit 7 arranged on the fore stage is not more than the threshold value Th2. When the number of black picture elements is not more than the threshold value Th2, candidate picture elements for processing are judged to be a highlighted portion, and a signal value S4 is outputted as "1". On the other hand, when the number of black picture elements is greater than the threshold value Th2, the candidate picture elements for processing are judged to be a non-highlighted portion (i.e., an intermediate density portion), and the signal value S4 is outputted as "0".

The signal values S3 and S4 obtained in the individual highlight detection circuits are inputted to the converted multi-value selection circuit 11.

f: Highlighted edge detection circuit

A description will now be given of a highlighted edge detection circuit 10. The highlighted edge detection circuit 10 judges as to whether or not an area of picture elements around a central picture element for processing in image data stored in the image memory circuit 1 is a highlighted edge portion. As shown in FIG. 14, the highlighted edge detection circuit 10 includes a first highlighted edge detection circuit 521 and a second highlighted edge detection circuit 522. The first highlighted edge detection circuit 521 judges as to whether or not the whole area (i.e., an area of 17×17 picture elements) around the central picture element for processing in the image data stored in the image memory circuit 1 is a highlighted edge portion. The second highlighted edge detection circuit 522 judges as to whether or not a small area (i.e., an area of 9×9 picture elements) around the central picture element for processing is a highlighted edge portion.

Figure 19:
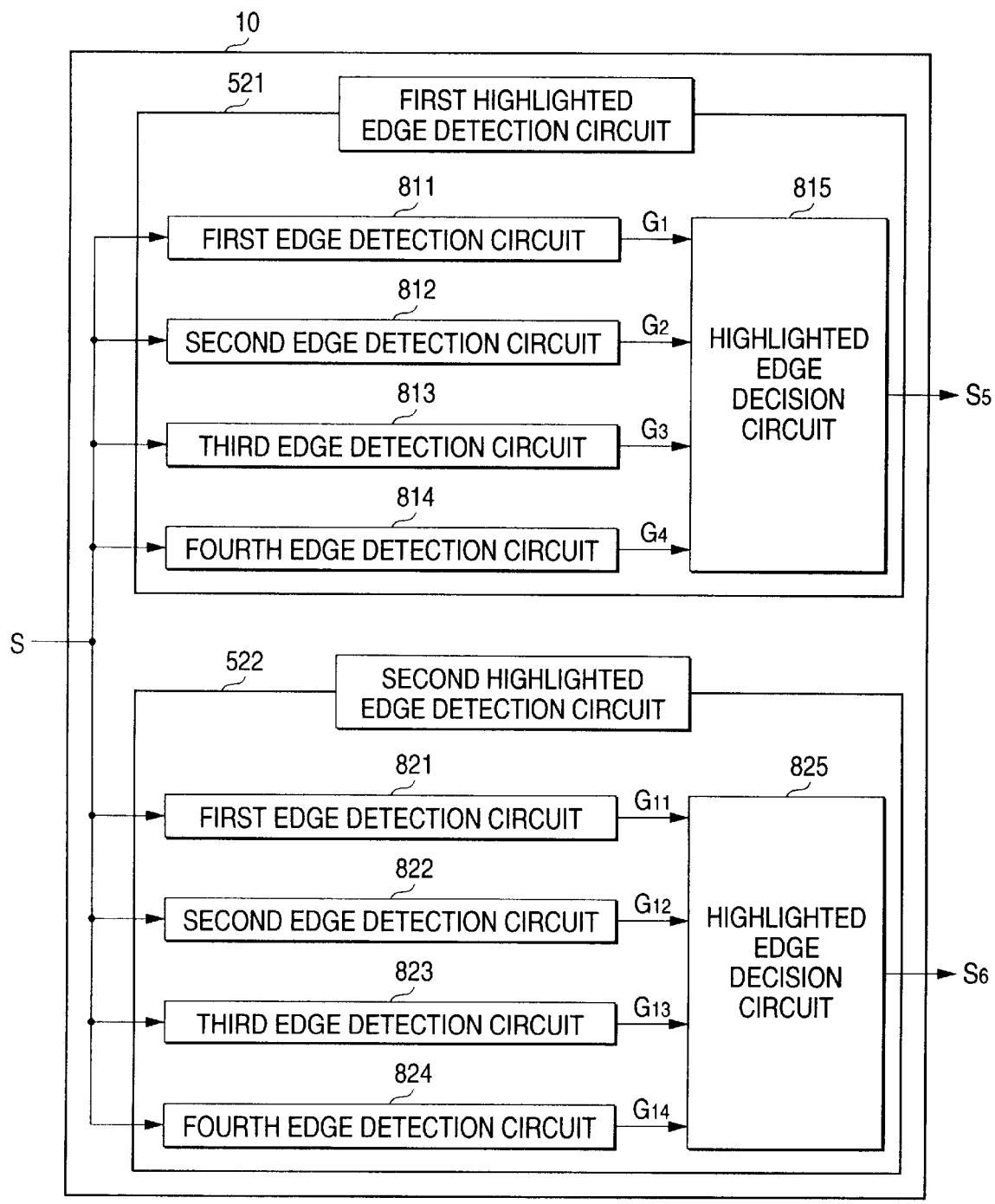
FIG. 19 is a block diagram showing the highlighted edge detection circuit in the image processing system.

A description will now be given of the operation of the first highlighted edge detection circuit 521. As shown in FIG. 19, the first highlighted edge detection circuit 521 includes first to fourth edge detection circuits 811 to 814 and a highlighted edge decision circuit 815.

Firstly, the respective edge detection circuits 811 to 814 of the first highlighted edge detection circuit 521 execute filter operation for image data (in an area of 17×17 picture elements) stored in the image memory circuit 1. Filter data shown in FIG. 20 are respectively stored in the edge detection circuits 811 to 814, and filter operation is performed using these filter data. The highlighted edge decision circuit 815 arranged on the post stage selects the maximum value among output values G1 to G4 of the edge detection circuits 811 to 814, and judges as to whether or not the selected maximum value is not less than a predetermined threshold value Thg1. When the maximum value is not less than the threshold value Thg1, candidate picture elements for processing are judged to be a highlighted edge portion, and a signal value S5 is outputted as "1". On the other hand, when the maximum value is less than the threshold value Thg1, the candidate picture elements for processing are judged to be a non-highlighted edge portion, and the signal value S5 is outputted as "0".

A description will now be given of the operation of the second highlighted edge detection circuit 522. The second highlighted edge detection circuit 522 is similar in operation to the first highlighted edge detection circuit 521, except for a processing area. Namely, the second highlighted edge detection circuit 522 executes detection of edge in an area of 9×9 picture elements around a central picture element for processing. Filter data shown in FIG. 21 are respectively stored in edge detection circuits 821 to 824 of the second highlighted edge detection circuit 522 shown in FIG. 19, and filter operation is performed using these filter data. Output values G11 to G14 obtained through the filter operation are inputted to a highlighted edge decision circuit 825 arranged on the post stage. The highlighted edge decision circuit 825 selects the maximum value among the output values G11 to G14 to judge an edge. Namely, when the selected maximum value is not less than a predetermined threshold value Thg2, candidate picture elements for processing are judged to be a highlighted edge portion, and a signal value S6 is outputted as "1". On the other hand, when the maximum value is less than the threshold value Thg2, the candidate picture elements for processing are judged to be a non-highlighted edge portion, and the signal value S6 is outputted as "0".

The signal values S5 and S6 obtained as described above are inputted to the converted multi-value selection circuit 11.

g: Converted multi-value selection circuit

The converted multi-value selection circuit 11 selects an optimum converted multi-value among the output values Sc1 to Sc5 of the first to fifth circuits 2 to 6 for conversion into multi-value on the basis of five kinds of signals, i.e., signal values S1 and S2 outputted from the edge detection circuit 8, signal values S3 and. S4 outputted from the highlight detection circuit 9 and signal values S5 and S6 outputted from the highlighted edge detection circuit 10. Subsequently, the converted multi-value selection circuit 11 outputs the selected optimum converted multi-value as scout. Table 1 shows criteria for selection as follows, and the details thereof will be described later.

TABLE 1

| Value of input signal to converted multi-value selection circuit ("—" represents "do not care") | | | | | | Selected converted multi-value |
|---|---|---|---|---|---|---|
| S1 | S2 | S3 | S4 | S5 | S6 | |
| 1 | — | — | — | — | — | Sc1 |
| 0 | 1 | — | — | — | — | Sc2 |
| 0 | 0 | 0 | 0 | — | — | Sc3 |
| 0 | 0 | 1 | — | 1 | 1 | Sc3 |
| 0 | 0 | 0 | 1 | — | 0 | Sc4 |
| 0 | 0 | 1 | — | 1 | 0 | Sc4 |
| 0 | 0 | 0 | — | 0 | — | Sc5 |

The converted multi-value Scout obtained with the above processes is outputted as an image through an image output unit A948.

(3) Configuration of circuit 926 for conversion into multi-value

The circuit 926 for conversion into multi-value is similar in configuration to the above circuit 927 for conversion into multi-value. However, a memory circuit on the first stage corresponding to the image memory circuit 1 has a size of 11×11 picture elements. In the circuit 947 for conversion into multi-value, the size of the filter in each of the highlight detection process, the highlighted edge detection process and the accompanying processes for conversion into multi-value is set to be equal to 17×17, 9×9 or 5×5 picture elements or the like. However, in the circuit 946 for conversion into multi-value, the size of the filter corresponding to each of the above processes is set to be appropriately smaller.

B: Operation in Mode of Embodiment

Figure 22:
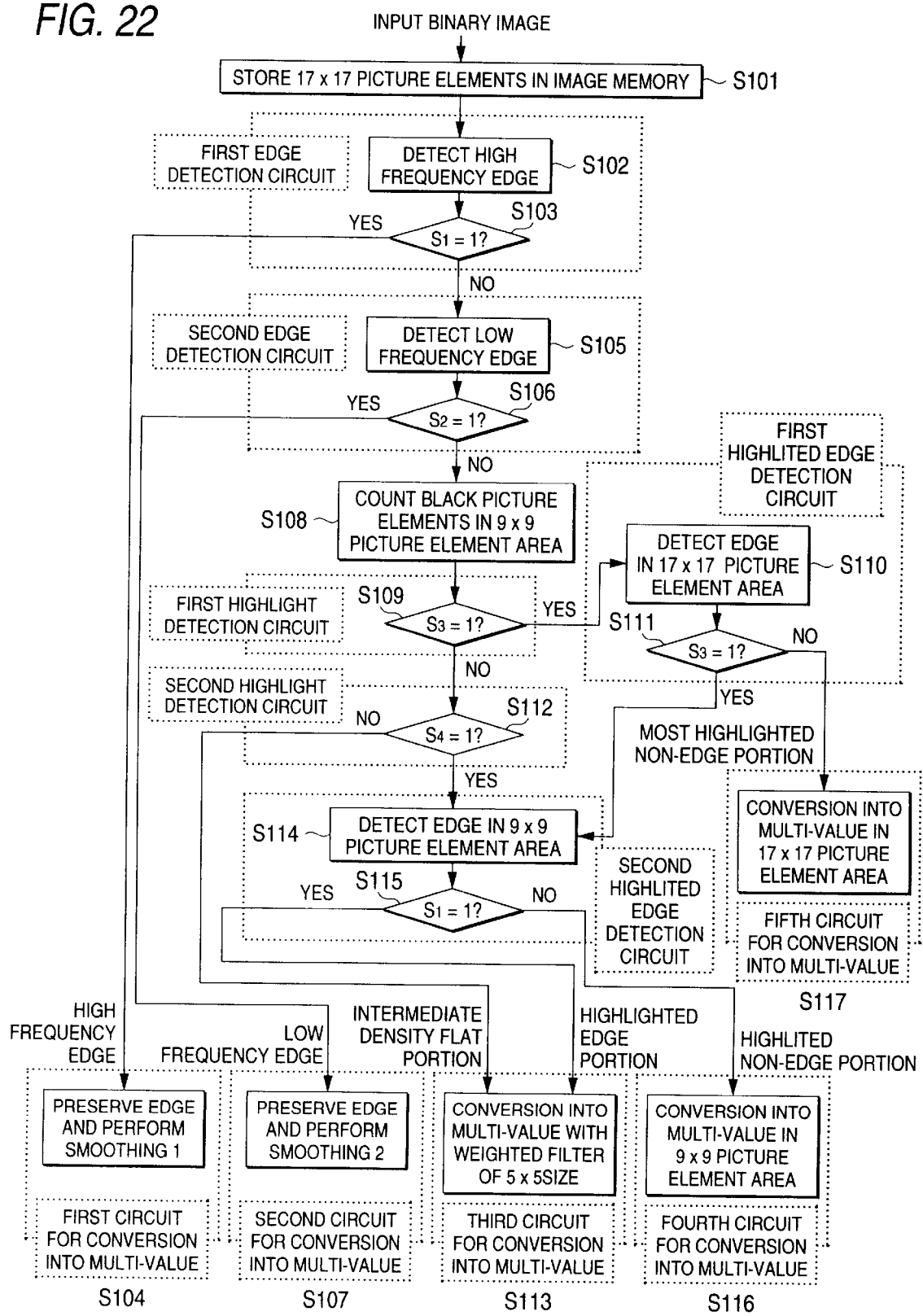
FIG. 22 is a flow chart for explaining the operation of a tone restoring process in the mode of embodiment.

A description will now be specifically given of the process in the circuit 947 for conversion into multi-value with reference to a flow chart in FIG. 22.

Firstly, in Step S101, binary image data of a portion corresponding to 17×17 picture elements around a central picture element for processing is stored in the image memory circuit 1.

a: Process in first edge detection circuit 501

Subsequently, in Steps S102 and S103, a process in the first edge detection circuit 501 is performed. An object of the first edge detection circuit 501 is to detect a high frequency edge component (i.e., an edge portion marked with a sharp change of density) of the binary image data stored in the image memory circuit. Specifically, the edge is detected using eight kinds of filter patterns shown in FIG. 16. A description will now be given of an edge detection process with reference to FIGS. 23 and 24 and also according to a flow chart in FIG. 25.

Now, assume that an area of 5×5 picture elements around a central picture element for processing, i.e., a candidate area for processing among image data (i.e., 17×17 picture elements) stored in the image memory circuit 1 is in a status as shown in FIG. 23.

Figure 25:
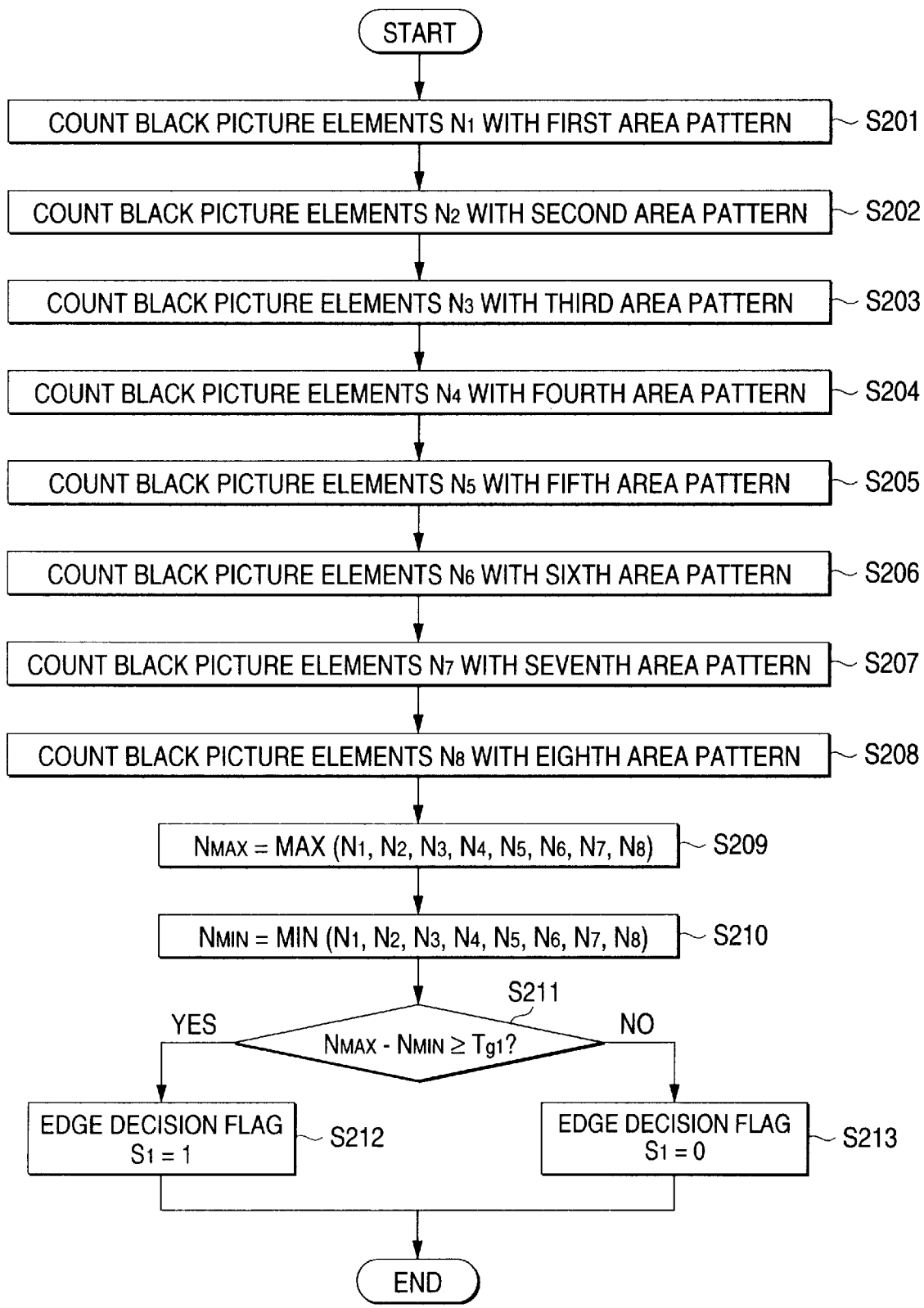
FIG. 25 is a flow chart showing the operation of a high frequency edge detection circuit in the image processing system.

Firstly, with respect to a set of picture elements shown in FIG. 23, the first area pattern shown in FIG. 16(*a*) is used to count black picture elements N1 contained in an area pattern portion (i.e., a hatched portion) (See Step 201 in FIG. 25). In this case, five black picture elements are counted, and the number of black picture elements N1 is found as N1=5 (See FIG. 24(*a*)). Similarly, in Step 202 in FIG. 25, the second area pattern shown in FIG. 16(*b*) is used to count black picture elements N2 contained in the area pattern portion (i.e., the hatched portion), and the number of black picture elements N2 is found as N2=3 (See FIG. 24(*b*)). Further, in Steps S203 to S208 in FIG. 25, the area patterns shown in FIGS. 16(*c*) to 16(*h*) are used to respectively count black picture elements contained in the corresponding area patterns, and the numbers of black picture elements N3 to N8 are found as N3=1, N4=3, N5=5, N6=3, N7=1 and N8=3 (See FIGS. 24(*c*) to 24(*h*)).

Subsequently, the numbers of black picture elements N1 to N8 thus counted are used to find the maximum value Nmax and the minimum value Nmin among N1 to N8 (See Steps S209 and S210 in FIG. 25). In this case, Nmax and Nmin are found as Nmax=N1=N5=5 and Nmin=N3=N7=1. When Nmax and Nmin thus obtained satisfy the following mathematical expression (1), candidate picture elements for processing are judged to be a high frequency edge portion, and a signal value S1 is outputted as "1" (See Steps S211 and S212 in FIG. 25). On the other hand, when Nmax and Nmin do not satisfy the mathematical expression (1), the candidate picture elements for processing are judged to be a non high frequency edge portion, and the signal value S1 is outputted as "0" (See Steps S211 and S213 in FIG. 25).

$$Nmax - Nmin \geq Tg1 \qquad (1)$$

where Tg1 represents a predetermined threshold value, and when Tg1 is defined as 4, for instance, the above mathematical expression is expressed as Nmax−Nmin=5−1=4, and therefore, the candidate picture elements for processing are judged to be an edge.

As described above, it is possible to detect an edge of $_8C_2$=28 components only by using a combination of eight kinds of patterns diverging from the central picture element in a plurality of a directions. Thus, a large number of edges can be easily detected with a simple configuration and also with high accuracy, inclusive of a point-symmetrical edge (See FIG. 23) which has had difficulty in detection heretofore. Further, it is not necessary to increase the number of memories for filter storage in proportion to the number of detectable edge components.

In the above mode of embodiment, a description has been given of a method of setting eight kinds of area patterns with respect to the area of 5×5 picture elements to detect an edge on the basis of the number of black picture elements. Otherwise, it is possible to modify the above mode of embodiment such that a reference area can be set to have a size of 7×7 or 9×9 picture elements or the like, or a larger number of area patterns can be set, or the edge can be detected on the basis of the number of white picture elements, instead of black picture elements, for instance.

Further, an edge of a low-tone image such as a ternary or quadri-valued image can be detected on the basis of an average density value or a variance of valued of picture elements contained in each area pattern, instead of the number of black picture elements. Namely, Nmax and Nmin can be respectively defined as the maximum value and the minimum value among average density values or variances of values of picture elements contained in each area pattern, and an edge is detected on the basis of a difference value between the maximum and minimum values.

b: Process when high frequency edge is detected

A description will now be given of a process for conversion into multi-value with reference to FIG. 22 again (See Step S104 in FIG. 22) when S1=1 in Step S103 (i.e., when the candidate picture elements for processing are judged to be the high frequency edge portion).

Figure 7:
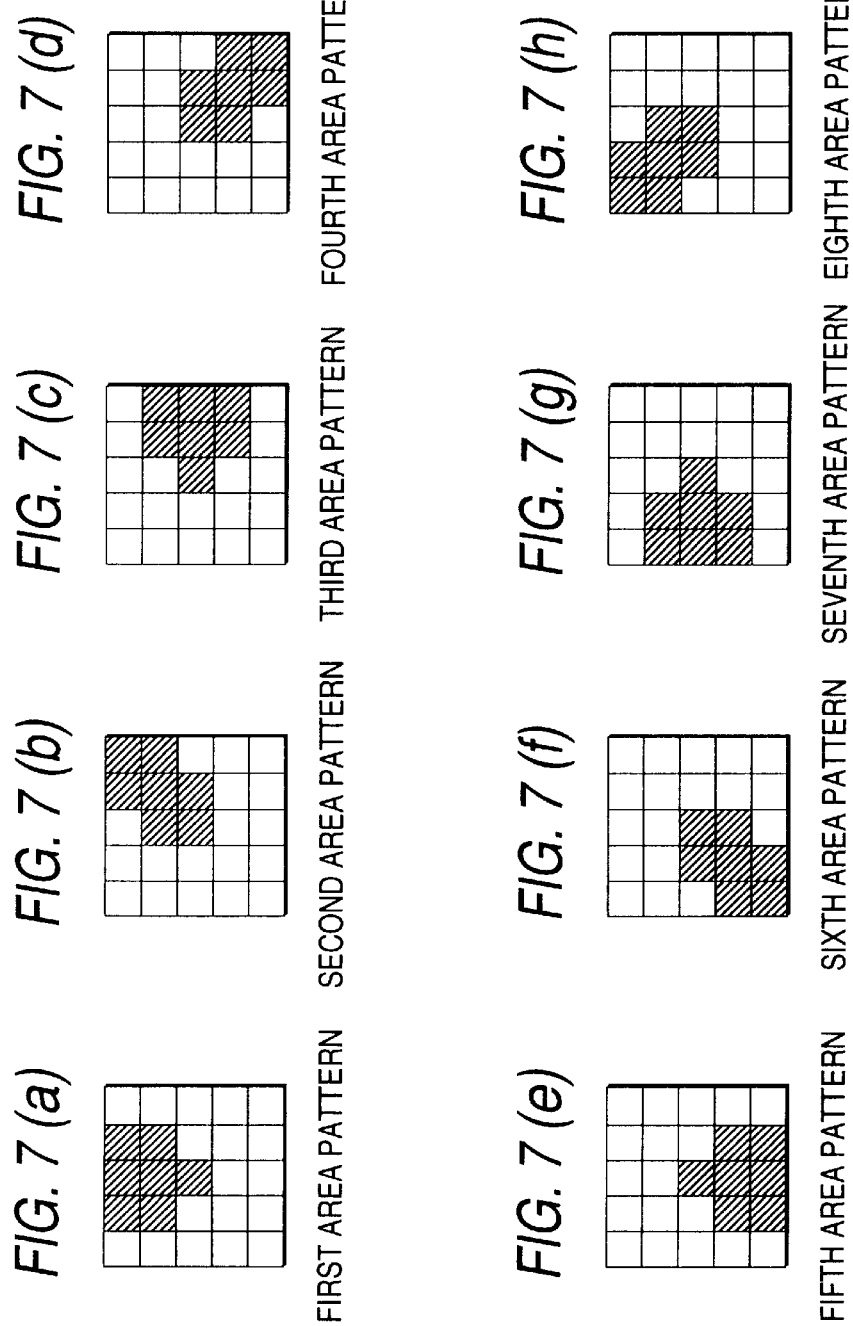
FIG. 7 is a view showing a filter for use in a process of converting a high frequency edge portion into multi-value in the image processing system.

The high frequency edge portion is converted into a multi-value on the basis of smoothing operation using nine kinds of area patterns shown in FIG. 7. A description will be specifically given of the process for conversion according to a flow chart in FIG. 26.

When the set of candidate picture elements for processing is in a status shown in FIG. 23, these candidate picture elements for processing are judged in the high frequency edge detection unit to be the edge portion. A routine is proceeded to Step S104, and a variance of picture element values in the area is detected with respect to picture elements contained in the first area pattern (i.e., a hatched portion) shown in FIG. 7(a). In case of FIG. 23, the picture elements contained in the first area pattern are as shown in FIG. 27(a). When the picture element values in the area are respectively expressed as P1, P2, . . . , P7 in the first area pattern, a variance σ1 is calculated using the following mathematical expression (2). For instance, when a black picture element value is defined as 1, and a white picture element value is defined as 0, the variance σ1 is found as σ1=0.20 (See Step S301 in FIG. 26)

$$\text{average density value } e = (1/n)\sum_{i=1}^{n} Pi; \tag{2}$$

-continued $$\text{variance } \sigma = (1/n)\sum_{i=1}^{n} (e - Pi)$$

(wherein P1, P2, P3, . . . , Pn respectively represent picture element values in a pattern, and n represents the number of reference picture elements in an area.)

Figure 26:
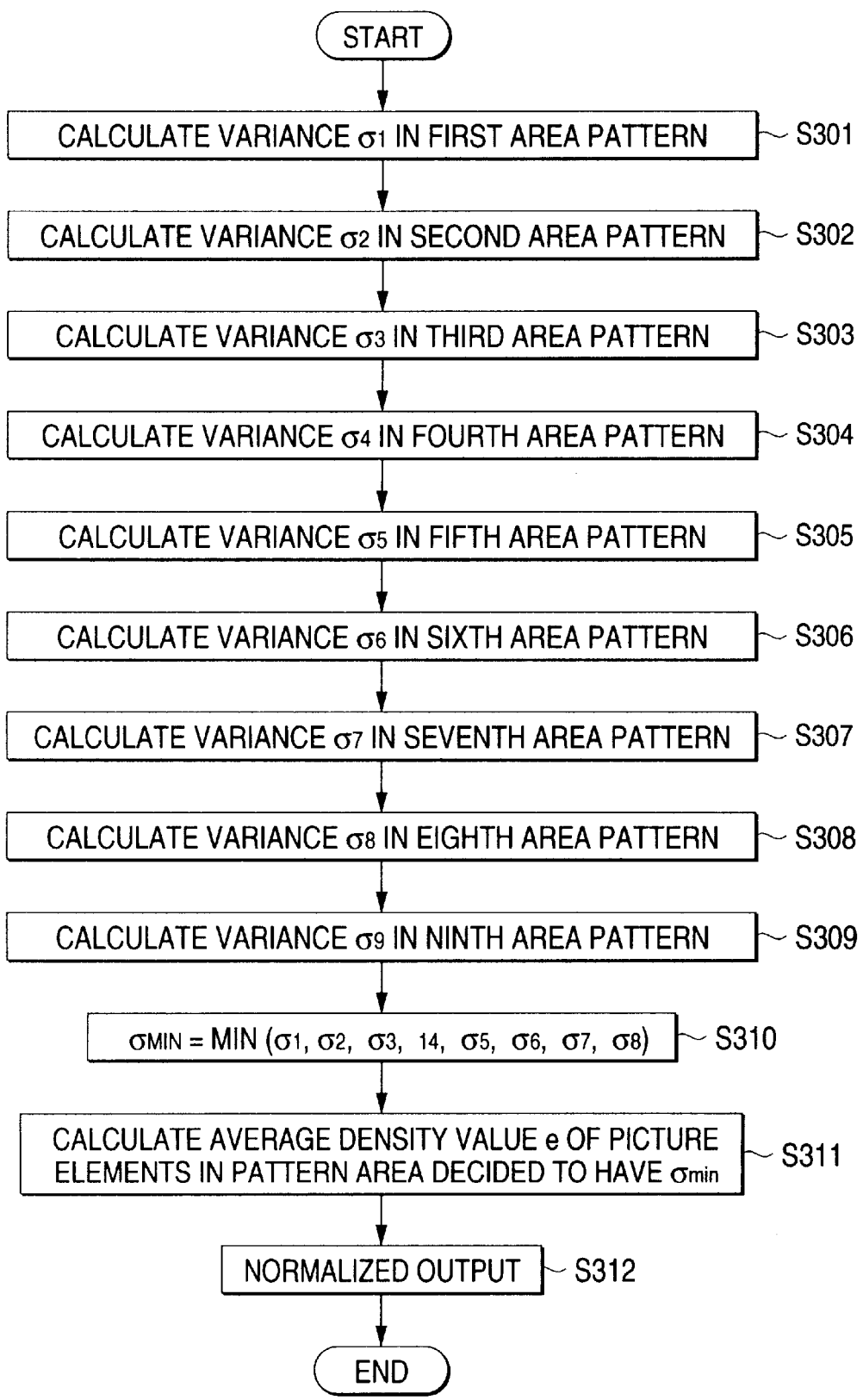
FIG. 26 is a flow chart showing the operation of the first circuit for conversion into multi-value and a process of converting a high frequency edge portion into a multi-value in the image processing system.

Similarly, with respect to the individual area patterns shown in FIGS. 7(b) to 7(h), supposing that n=7, variances σ2 to σ8 are found as σ2=0.24, σ3=0.12, σ4=0.24, σ5=0.20, σ6=0.24, σ7=0.12 and σ8=0.24 (See Steps S302 to S308 in FIG. 26)

Since the ninth area pattern shown in FIG. 7(i) contains nine picture elements as reference picture elements in an area, a variance σ9 in the ninth area pattern is found using the mathematical expression (2), supposing that n=9. Thus, the variance σ9 is found as σ9=0.22 (See Step S309 in FIG. 26).

The variances thus obtained represent that the higher the variance is, a change of density is more sharply i.e., a high variance represents an area constituting an edge. On the other hand, a low variance represents a flat area. Thus, it is possible to prevent deterioration of image quality (i.e., edge can be preserved) by performing smoothing using the picture elements contained in the area pattern (i.e., the most flat area) decided to have the lowest variance, to the exclusion of the picture elements constituting the edge. In the above embodiment, the minimum value σmin among the variances is found as σmin=σ3=σ7=0.12 (See Step S310 in FIG. 26), and the average density value σ3 or σ7 of values of the picture elements contained in the third or seventh area pattern results in an output value. Thus, the output value is found as output value=average density value e3 (e=7) 0.14 (Step S311). Finally, the output value is normalized to obtain a converted multi-value Sc1 (Step S312). In case of converting into 256 tones (8 bits), for instance, the output value is normalized by performing calculation according to the following mathematical expression (3).

$$\text{Normalized output (converted multi-value output)=average density value } e \times 255 \tag{3}$$

(wherein fractions of 0.5 and over as a unit are counted and the rest is cut away. In case of exceeding "255", "255" is provided as the output value.)

Accordingly, in the above case, the mathematical expression (3) is expressed as:

$$\sigma 3 \ (=\sigma 7) \times 0.12 \times 255 = 30.6,$$

and thus, Sc1=31.

According to the above process, the operation for conversion into multi-value can be performed with the edge preserved. Thus, it is possible to obtain a converted multi-value image of high quality without having any scatter, even in a fine linear image pattern or the like. Further, the above process hardly affects isolated picture elements (i.e., noise picture elements) around the edge, and as a result, there is no possibility that the isolated picture elements remain as noise such as moire after conversion into multi-value. In the above mode of embodiment, the filter of 5×5 size is used for operation for conversion into multi-value. Otherwise, a filter of 7×7 or other size can be used according to the characteristics of an image to perform operation for conversion into multi-value according to the similar processes, or other areas can be set for operation.

c: Operation of second edge detection circuit 502

A description will now be given of a process (Step S105) when the candidate picture elements for processing are judged to be the non-high frequency edge portion with reference to FIG. 22 again. An object of the second edge detection circuit 502 is to detect a low frequency edge portion (i.e., an edge portion marked with a gentle change of density) frequently contained in a pseudo intermediate picture element. On the assumption that the signal value S1 is found as S1=0 in Step S103 in FIG. 22, the process in the second edge detection circuit 502 is started. Specifically, the edge is detected in Step S105 using filters of eight kinds of patterns shown in FIG. 7. A description will now be given of a procedure of edge detection with reference to FIGS. 7, 28 and 29 and also according to a flow chart in FIG. 30.

Now, assume that an area of 7×7 picture elements around a central picture element for processing, i.e., a candidate area for processing among image data (i.e., 17×17 picture elements) stored in the image memory circuit 1 is in a status shown in FIG. 28. Firstly, with respect to a set of picture elements shown in FIG. 28, the first area pattern shown in FIG. 7($a$) is used to count black picture element N11 contained in an area pattern portion (i.e., a hatched portion) (See Step S401 in FIG. 30). In this case, six black picture elements are counted, and the number of black picture elements N11 is found as N11=6 (See FIG. 29($a$)). Similarly, the second area pattern shown in FIG. 7($b$) is used to count black picture elements N12 contained in the area pattern portion (i.e., a hatched portion) (See Step S402 in FIG. 30), and the number of black picture elements N12 is found as N12=5 (See FIG. 29($b$)).

Similarly, the third to eighth area patterns shown in FIGS. 7($c$) to 7($h$) are used to respectively count black picture elements contained in the corresponding area patterns (See Steps S403 to S408 in FIG. 30), and the number of black picture elements N13 to N18 are respectively found as N13=2, N14=5, N15=6, N16=5, N17=2 and N18=5 (See FIGS. 29($c$) to 29($h$)).

Figure 30:
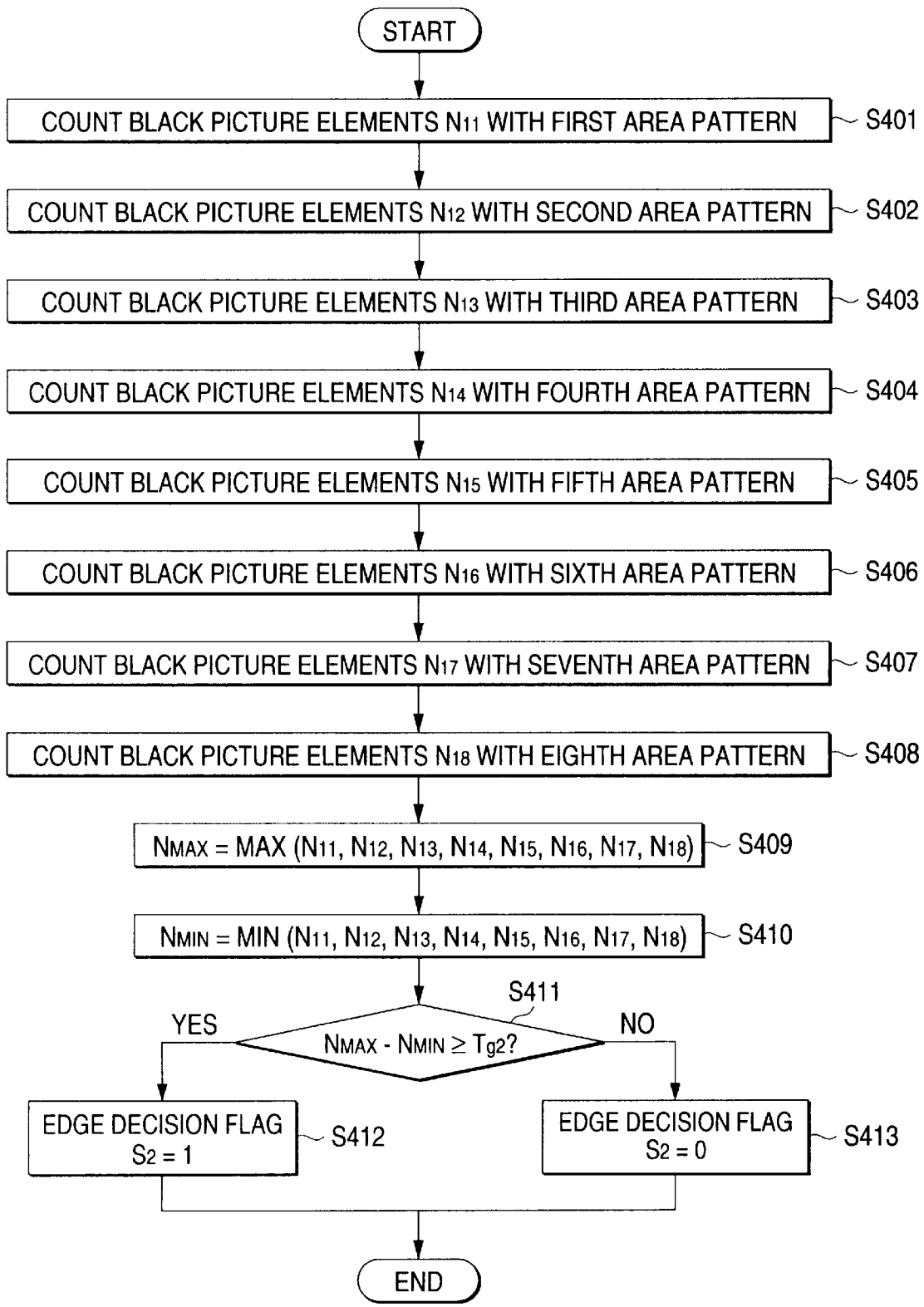
FIG. 30 is a flow chart showing the operation of a low frequency edge detection circuit in the image processing system.

Subsequently, the numbers of black picture elements N11 to N18 thus counted are used to find the maximum value Nmax and the minimum value Nmin among N11 to N18, and as a result, Nmax and Nmin are found as Nmax=N11=N15=6 and Nmin=N13=N17=2 (See Steps S409 and S410 in FIG. 30). Then, a judgment is made as to whether or not Nmax and Nmin thus obtained satisfy the following mathematical expression (4). When Nmax and Nmin satisfy the mathematical expression (4), candidate picture elements for processing are judged to be a low frequency edge portion, and a signal value S2 is outputted as "1" (See Steps S411 and S412 in FIG. 30). On the other hand, when the candidate picture elements for processing are judged to be a non-low frequency edge portion, the signal value S2 is outputted as "0" (See Steps S411 and S412 in FIG. 30).

$$\text{Nmax} - \text{Nmin} \geq \text{Tg2} \qquad (4)$$

(wherein Tg2 represents a predetermined threshold value, and is defined as 4 in the above mode of embodiment).

In the above case, since the mathematical expression (4) is expressed as Nmax−Nmin=6−2=4, the candidate picture elements for processing are judged to be the edge portion. As described above, the second edge detection circuit 502 can detect the low frequency edge portion frequently contained in the pseudo intermediate picture element. Further, a large number of edge components can be detected easily with high accuracy, inclusive of a point-symmetrical edge (See FIG. 28) which has had difficulty in detection heretofore. Also, it is not necessary to increase the number of memories for filter storage.

d: Process when low frequency edge is detected

A description will now be given of a process for conversion into multi-value (See Step S107 in FIG. 22) when S2=1 (i.e., when the candidate picture elements for processing are judged to be the low frequency edge portion) in Step S106 in FIG. 22. The low frequency edge portion is converted into a multi-value using eight kinds of area patterns shown in FIG. 9. These area patterns are similar to those (See FIG. 7) used in the process for conversion into multi-value in Step S104 in FIG. 22, except for the kind of picture elements used for smoothing.

According to the basic concept of the process in the second edge detection circuit, the picture elements constituting the edge are not used for operation for conversion into multi-value (i.e., smoothing operation) as much as possible, similarly to the process for conversion into multi-value in Step S104 in FIG. 22. By so doing, it is possible to hold down an influence on noise picture elements around the edge to the minimum. A description will now be specifically given of the details of the process for conversion with reference to FIGS. 9, 28 and 32 and also according to a flow chart in FIG. 31. Assuming that a set of candidate picture elements for processing is in a status shown in FIG. 28, these candidate picture elements for processing are judged to be the low frequency edge portion as described above.

Figure 32:
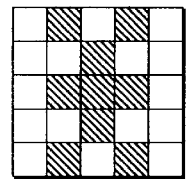
FIG. 32 is a view showing a candidate area for processing the edge in FIG. 28 when converting a low frequency edge portion into a multi-value.

Subsequently, a process in an area of 5×5 picture elements around the central picture element for processing shown in FIG. 28 is performed (See FIG. 32). With respect to the area of 5×5 picture elements, eight kinds of area patterns shown in FIGS. 9($a$) to 9($h$) are used to calculate a variance of picture elements contained in an A area (i.e., a hatched portion) of each area pattern. In case of FIG. 32, the picture elements contained in the A area of the first area pattern shown in FIG. 9($a$) are in a status shown in FIG. 23($a$). A variance σ11 is then calculated using the mathematical expression (2) (i.e., supposing that n=7).

Figure 31:
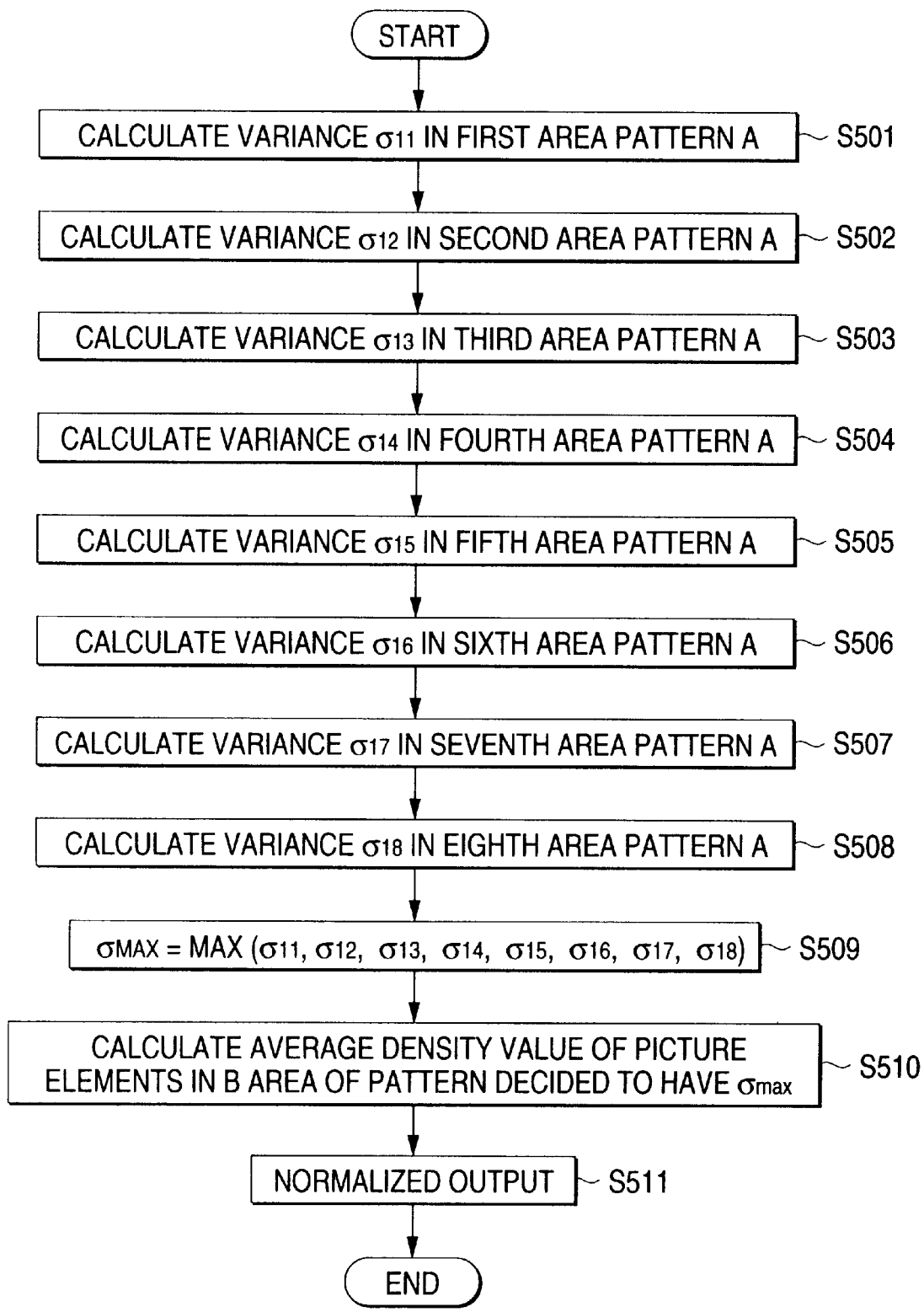
FIG. 31 is a flow chart showing the operation of the low frequency edge detection circuit and a process of converting a low frequency edge portion into multi-value in the image processing system.
Figure 34:
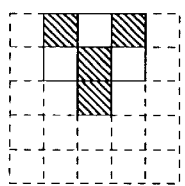
FIG. 34 is a view showing a case of applying the filter shown in FIG. 9 to the area shown in FIG. 32 (FIG. 28)
Figure 34:
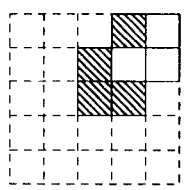
Figure 34:
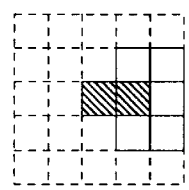
Figure 34:
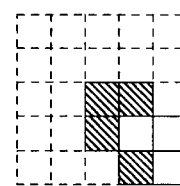
Figure 34:
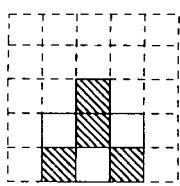
Figure 34:
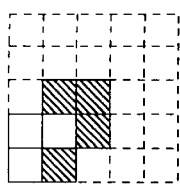
Figure 34:
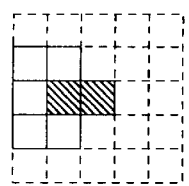
Figure 34:
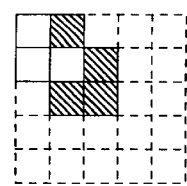

For instance, when the black picture element value is defined as "1", and the white picture element value is defined as "0", the variance σ11 is found as σ11=0.24 (See Step S501 in FIG. 31). Similarly, each of variances in other area patterns (b) to (h) is calculated, and as a result, the variances σ12 to σ18 are found as σ12=0.24, σ13=0.20, σ14=0.24, σ15=0.24, σ16=0.24, σ17=0.24 and σ18=0.24 (See Steps S501 to S508 in FIG. 31). FIGS. 34($b$) to 34($h$) respectively show picture elements contained in the area patterns shown in FIGS. 9($b$) to 9($h$) with respect to the area shown in FIG. 28.

The variances thus obtained with respect to the picture elements in the A area are used to calculate a converted multi-value according to the following criteria. (See Step S509 in FIG. 31).

i: An area pattern decided to have the maximum variance is found to perform smoothing operation using picture elements contained in an outside area (i.e., an area without hatching, which will be hereinafter referred to as B area) of the area pattern.

ii: When a plurality of area patterns decided to have the maximum variance are present, one of the area patterns is arbitrarily selected to perform smoothing operation using the picture elements contained in the B area of the selected area pattern.

The converted multi-value is calculated in this case on the basis of a concept that an area decided to have a high variance is regarded as an area containing an edge, and picture elements of an area other than the edge area are used for operation.

In the above embodiment, since the maximum variance max is found as σmax=σ11=σ12=σ14=σ15=σ16=σ18=

Figure 33:
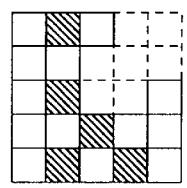
FIG. 33 is a view showing picture elements used for converting the low frequency edge portion into a multi-value in case of applying the filter shown in FIG. 9 to the area shown in FIG. 32 (FIG. 28)

0.24, it applies to the condition ii described above. If σ12 is selected as the maximum variance σmax, the picture elements contained in the B area shown in FIG. 9(a), i.e., those shown in FIG. 33 are used for conversion into multi-value.

Accordingly, an output multi-value is found using the following mathematical expression (5).

$$\text{average density value } e = (1/n)\sum_{i=n}^{18} Pi \qquad (5)$$

wherein values of picture elements within the B area are respectively expressed as P1, P2, P3, . . . , P15.

Thus, in case of FIG. 33, the average density value e12 is found as σ12=0.27. Finally, the output value is normalized using the above mathematical expression (3), and the resultant value is provided as a converted multi-value Sc2. In this case, the above mathematical expression (3) is expressed as e12×0.27×255=68.85, and "69" resulting from rounding 68.85 to one decimal place is found as the converted multi-value Sc2.

According to the above process, it is possible to perform operation for conversion into multi-value, in which an edge is preserved and importance is placed on tone. Thus, the low frequency edge frequently contained in the pseudo intermediate tone portion can be also converted into a multi-value of high quality. In addition, considering that it is possible to cope with a large number of edges, the configuration is more simple than that in a prior art to easily make a hardware. In the above mode of embodiment, the filter of 5×5 size is used for operation. Otherwise, a filter of other size can be used for operation for conversion into multi-value according to the similar process, or other areas can be set.

e: Operation of highlight detection circuit 9

A description will now be given of the operation of the highlight detection circuit 9 (See Steps S108, S109 and S112 in FIG. 22). The highlight detection circuit 9 judges how brightness a candidate area for processing has. According to the mode of embodiment, the degree of highlight in a candidate area for processing is classified into two levels, and an area having other levels of brightness is judged to be an intermediate density portion.

Firstly, black picture elements in an area of 9×9 picture elements around a central candidate picture element for processing are counted (See Step S108 in FIG. 22). Subsequently, the process in the first highlight detection circuit 511 is started in Steps S109 in FIG. 22. In this case, a judgment is made as to whether or not the number of black picture elements counted in Step S108 satisfies the following mathematical expression (6). When the number of black picture elements thus counted satisfies the mathematical expression (6), candidate picture elements for processing are judged to be a most highlighted portion which is an extremely bright portion, and a signal value S3 is outputted as "1". On the other hand, when the number of black picture elements does not satisfy the mathematical expression (6), the candidate picture elements for processing are to be a non most highlighted portion, and the signal value S3 is outputted as "0".

When S3=0, the process in the second highlight detection circuit 512 is subsequently performed. On the other hand, when S3=1, a highlighted edge detection process is performed in Step S110. number of black picture elements in area of 9×9 picture $$\text{elements} \leq Th1 \qquad (6)$$

(wherein Th1 represents a predetermined threshold value, and is defined as 7 in the above mode of embodiment).

Now, assume that an area of 9×9 picture elements around a central picture element for processing, i.e., a candidate area for processing among image data (i.e., 17×17 picture elements) stored in the image memory circuit 1 is in a status shown in FIG. 35(a). In this case, five black picture elements in total are contained in the candidate area for processing, and therefore, satisfy the mathematical expression (6). Accordingly, candidate picture elements for processing are judged to be the most highlighted portion, and the signal value S3 is outputted as "1". On the other hand, when the candidate area for processing described above is in a status shown in FIG. 35(b), ten black picture elements in total are contained in the candidate area for processing, and therefore, do not satisfy the mathematical expression (6). Accordingly, the candidate picture elements for processing are judged to be the non most highlighted portion, and the signal value S3 is outputted as "0".

A description will now be given of the operation of the second highlight detection circuit 512. The output signal value S4 obtained in the second highlight detection circuit 512 is effective only when S3=0. Firstly, a judgment is made as to whether or not the number of black picture elements counted in Step S108 in FIG. 22 satisfies the following mathematical expression (7). When the number of black picture elements thus counted satisfies the mathematical expression (7), candidate picture elements for processing are judged to be the highlighted portion, and the signal value S4 is outputted as "1". On the other hand, when the number of black picture elements does not satisfy the mathematical expression (7), the candidate picture elements for processing are judged to be the non-highlighted portion (i.e., an intermediate density flat portion), and the signal value S4 is outputted as "0".

Number of black picture elements in area of 9×9 picture $$\text{element} \leq Th2 \qquad (7)$$

(wherein Th2 represents a predetermined threshold value, and satisfies the relation of Th2>Th1. In the mode of embodiment, Th2 is defined as 10.)

Now, assume that an area of 9×9 picture elements around a central picture element for processing, i.e., a candidate area for processing among image data (i.e., 17×17 picture elements) stored in the image memory circuit 1 is in a status shown in FIG. 35(b), for instance. In this case, the signal value S3 is outputted as "0" in Step S109, and ten black picture elements in total are contained in the area of 9×9 picture element described above, and therefore, satisfy the mathematical expression (7). Accordingly, candidate picture elements for processing are judged to be the highlighted portion, and the signal value S4 is outputted as "1". On the other hand, when the candidate area for processing described above is in a status shown in FIG. 35(c), the signal value S3 is outputted as "0" in Step S109. However, in this case, fifteen black picture elements in total are contained in the area of 9×9 picture elements described above, and therefore, do not satisfy the mathematical expression (7). Accordingly, candidate picture elements for processing are judged to be the non-highlighted portion (i.e., an intermediate density flat portion), and the signal value S4 is outputted as "0".

The process in the highlight detection circuit 9 is performed as described above. In the mode of embodiment, a description has been given of a case where the degree of brightness of highlight in the candidate area for processing is classified into two levels, and the area having other levels of brightness is judged to be the intermediate density portion. Otherwise, the number of threshold values for judgment can be increased to classify the degree of brightness into more levels. Further, an area of other size can be used for judgment, instead of the area of 9×9 picture elements. Furthermore, when a low-tone image such as ternary or quadri-valued image is converted into a multi-value image, the average density value within the area can be used for criteria for classification of highlight.

f: Operation when non-highlighted portion is detected

A description will now be given of a process for conversion into multi-value (i.e., operation of third circuit 4 for conversion into multi-value) when S4=0 in Step S112 in FIG. 22, namely, when the non-highlighted proton is detected. In this case, since the candidate picture elements for processing are judged to be the non-highlighted portion (i.e., an intermediate density flat portion), a weighted filter shown in FIG. 10 is used for smoothing such as to place importance on tone, and to prevent appearance of fine pattern or like edge contained in the intermediate density portion.

For instance, the candidate area for processing shown in FIG. 35(*b*) is judged to be the non-highlighted portion (i.e., an intermediate density flat portion) as described above, and therefore, a description will now be given of a case of smoothing the candidate area for processing shown in FIG. 35(*b*) using the filter shown in FIG. 10. Firstly, an area of 5×5 picture elements around the central picture element shown in FIG. 35(*b*) is taken out for the process for conversion, as shown in FIG. 36. When the filter shown in FIG. 10 is applied to the taken-out area, the output value of the central picture element for processing is found as 0.19 according to convolution operation (the filter operation method is well known, and therefore, a detailed description thereof will be omitted). Further, the output value is normalized into 8 bits (i.e., 256 tones) using the mathematical expression (3), and as a result, the converted multi-value Sc3 is found as follows.

$$Sc3=0.19 \times 255=49$$

g: Operation of highlighted edge detection circuit 10

A description will now be given of the operation of the highlighted edge detection circuit 10. When the candidate area for processing is judged in the highlight detection circuit 9 to be the highlighted portion, the highlighted edge detection circuit 10 judges as to whether or not an edge is detected in an area around the candidate area for processing (hereinafter will be referred to as an edge detection area). When no edge is detected in the edge detection area, the edge detection area is judged to be a highlighted portion, and subsequently, picture elements within the edge detection area are used to convert the highlighted portion into a multi-value as will be described later. When the edge is detected, the edge detection area is reduced, and subsequently, the edge is further detected in the reduced area. The above edge detecting operation is repeated until the edge is finally detected in the edge detection area reduced to a certain size. When the edge is detected in the reduced edge detection area, the edge detection area is judged to be a highlighted edge portion, and subsequently, the highlighted edge portion is converted into a multi-value. On the other hand, when no edge is detected, the reduced edge detection area is judged to be a highlighted portion, and subsequently, the highlighted portion is converted into a multi-value. In the mode of embodiment, the edge detection area is reduced into two stages.

The process in the highlighted edge detection circuit is effective only when the candidate picture elements for processing are judged to be the highlighted portion in the first or second highlight detection circuit 511 or 512 of the highlight detection circuit 9. Accordingly, the process in the highlighted edge detection circuit is performed on the assumption that S3=1 or S4=1.

Firstly, a description will be given of a process in the first highlighted edge detection circuit 521, i.e., a process when it is judged that S3=1 in Step S109 with reference to FIG. 22 again. Secondly, a description will be given of a process in the second highlighted edge detection circuit 522, i.e., a process when it is judged that S4=1 in Step S112.

An object of the first highlighted edge detection circuit 521 is to judge as to whether or not an edge is detected in an area around the most highlighted portion (i.e., an edge detection area) detected in Step S109 in FIG. 22. Specifically, the edge is detected using a filter pattern of the size of 17×17 picture elements, i.e., picture elements around the area of 9×9 picture elements around the central picture element for processing shown in FIG. 20. A description will now be given of the procedure of edge detection with reference to FIGS. 20, 35, 37 and 38 and also according to a flow chart in FIG. 39.

Figure 35:
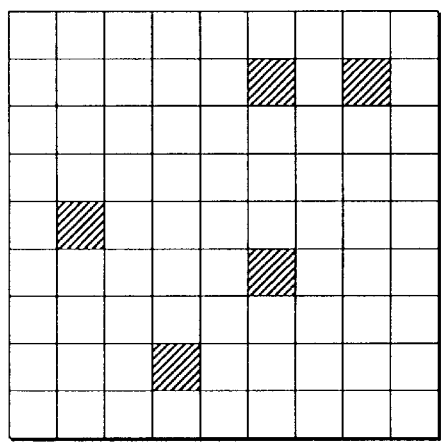
FIG. 35 is a view showing picture elements for explaining the operation of the highlight detection circuit.
Figure 35:
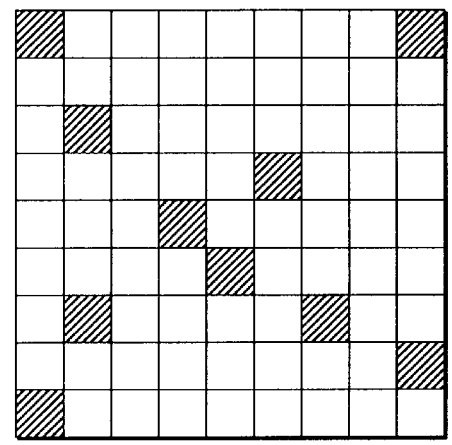
Figure 35:
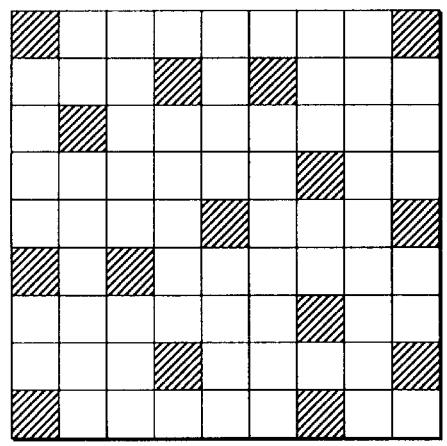
Figure 36:
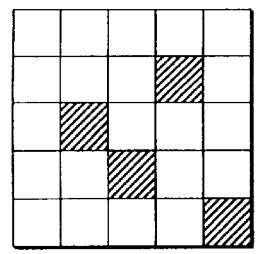
FIG. 36 is a view showing a candidate area for processing the picture elements in FIG. 35 for explaining the operation of the third circuit for conversion into multi-value in the image processing system.
Figure 37:
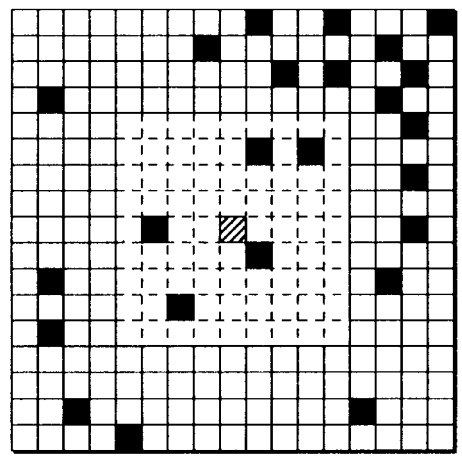
FIG. 37 is a view showing picture elements for explaining the operation of the first highlighted edge detection circuit in the image processing system.
Figure 38:
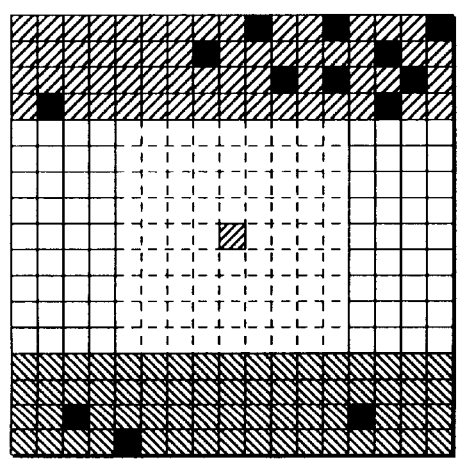
FIG. 38 is a view showing a case of applying the filter shown in FIG. 20 to the picture elements shown in FIG. 37.
Figure 39:
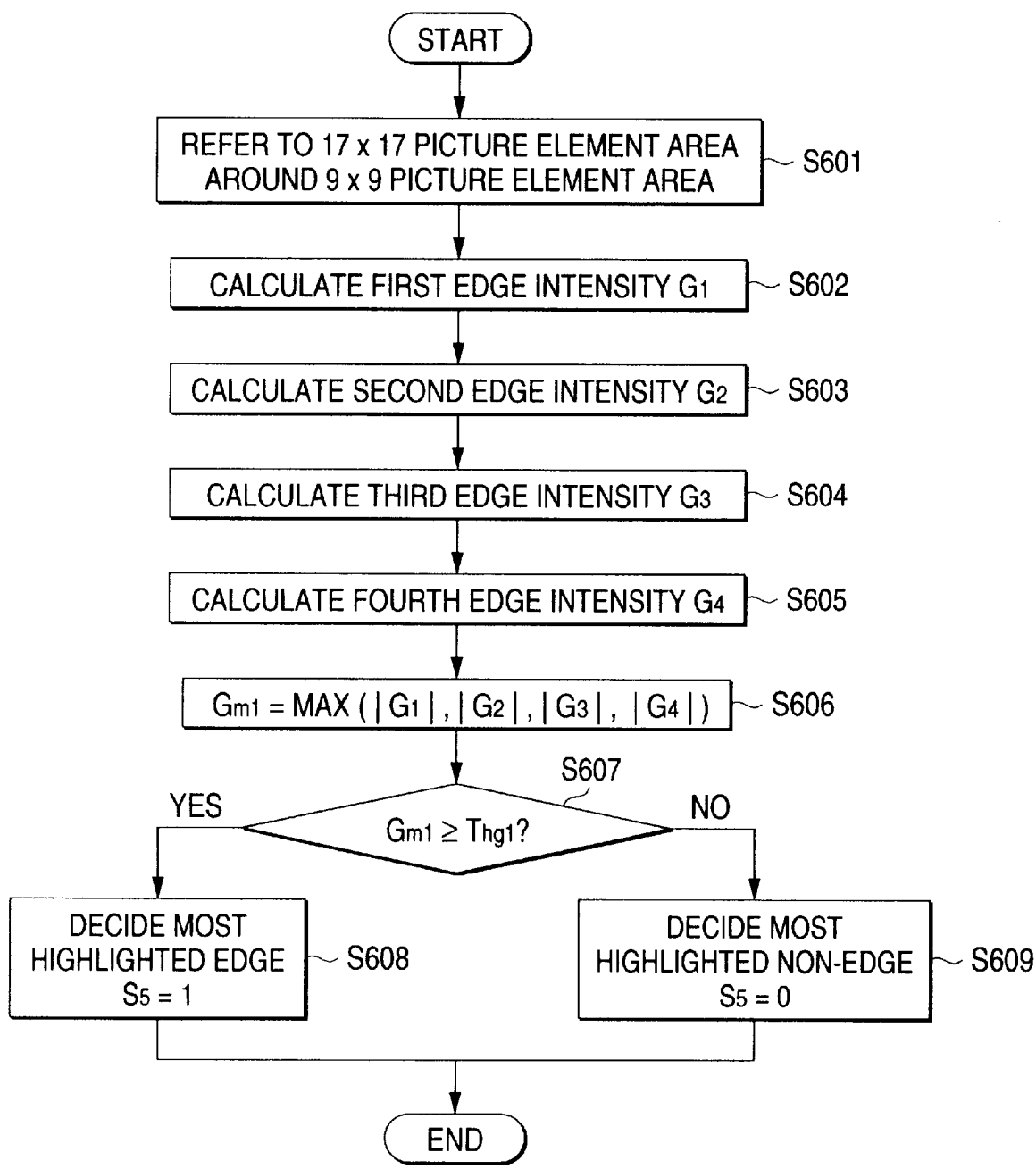
FIG. 39 is a flow chart for explaining the operation of the first highlighted edge detection circuit in the image processing system.

Now, assume that a set of candidate picture elements for edge detection is in a status shown in FIG. 35(*a*). In this case, as described above, the candidate picture elements for processing are judged to be the most highlighted portion. Subsequently, a wider area of 17×17 picture elements (i.e., an edge detection area) is referred to as a candidate area for processing the set of picture elements contained in the area of 9×9 picture elements shown in FIG. 35(*a*) (See FIG. 20 and Step S601 in FIG. 39). Now, assume that the area at this time is in a status shown in FIG. 37. When applying the filter shown in FIG. 20(*a*), the picture elements contained in the hatched portion are in a status shown in FIG. 38. When the picture elements shown in FIG. 38 are subjected to filter operation with a predetermined coefficient, the edge intensity (i.e., an absolute value) of the central picture element for processing is found as $|G1|=7$ (See Step S602 in FIG. 39). Similarly, when the filters shown in FIGS. 20(*b*) to 20(*d*) are used for operation with respect to the set of picture elements shown in FIG. 37, the edge intensities (i.e., the absolute values) are respectively found as $|G2|=5$, $|G3|=8$ and $|G4|=0$ (See Steps S603 to S605 in FIG. 39).

Subsequently, the edge intensities $|G1|$ to $|G4|$ thus obtained are used to find the maximum value among $|G1|$ to $|G4|$. The obtained maximum value is expressed as Gm1 (Step S606). Then, the edge is judged using the following mathematical expression (8) (Step S607).

Namely, when the maximum value Gm1 satisfies the mathematical expression (8), the edge detection area around the candidate picture elements for processing is judged to be a most highlighted edge portion, and a signal value S5 is outputted as "1" (Step S608). On the other hand, when the maximum value Gm1 does not satisfy the mathematical expression (8), the edge detection area is judged to be a non-most highlighted portion, and the signal value S5 is outputted as "0" (Step S609).

$$Gm1 \geq Thg1 \qquad (8)$$

(wherein Thg represents a predetermined threshold value, and is defined as 7 in the mode of embodiment.) Accordingly, in case of the above embodiment, Gm1 is found as $Gm1=|G3|=8$, and therefore, satisfies the mathematical expression (8). Thus, the edge is detected in the edge detection area around the candidate picture elements for processing and the edge detection area is judged to be the highlight edge portion. When the signal value S5 is found as S5=1, the routine is proceeded to Step S114. In Step S114, the edge detection area is reduced to an area of 9×9 picture elements, and the process in the second highlighted edge detection circuit 522 is performed (which will be described later). On the other hand, when the maximum value Gm1 does not satisfy the mathematical expression (8) and the signal value S5 is found as S5=0, the candidate picture elements for processing are judged to be the most highlighted non-edge portion, which is then converted into a multi-value (smoothed) in Step S117 in FIG. 22.

The process in the first highlighted edge detection circuit 521 is performed as described above. In the mode of embodiment, the filter of the size of 17×17 picture elements is used for edge detection. However, other-sized filters or a well-known edge detection filter enabling the similar process can be used for edge detection. Incidentally, when a low-tone image such as ternary or quadri-valued image is converted into a multi-value image, the similar process is made possible by performing the operation on the basis of the average density value of the picture elements within the edge area.

h: Process of most highlighted non-edge portion

A description will now be given of a process when S5=0 in Step S111 of FIG. 22, i.e., a process in the fifth circuit 6 for conversion into multi-value. In this case, since the area round the candidate picture elements for processing is judged to be the highlighted non-edge portion, the picture elements contained in the area are considered to be noise peculiar to the error-diffused picture elements and then smoothed for removing the noise. This smoothing process is simply performed only using a window of 17×17 size. Since the smoothing process is well known, a detailed description thereof will be omitted. Consequently, the resultant value is normalized using the mathematical expression (3) to obtain the signal value Sc5. Further, as is analogized with ease, other-sized windows or a well-known noise removal filter can be used for smoothing.

As described above, according to the mode of embodiment, when the counted value of black picture elements contained in the area of 9×9 picture elements is not less than a predetermined value (namely, when the average density value of the area of 9×9 picture elements is not more than a predetermined value) in Step S108, the conversion into multi-value is performed on the basis of the picture element value within the enlarged area more than that of 9×9 picture elements, i.e., the area of 17×17 picture elements. Thus, isolated dots (i.e., noise) of the highlighted portion due to the error diffusion can be reduced (or disappeared) to obtain a reproduced image of high quality.

In Step S108, the black picture elements are counted. However, the white picture elements can be counted to judge as to whether or not the counted value is not more than a predetermined value. Further, when candidate picture elements for processing constitute multi-valued data, the average density value within the candidate area (i.e., the area of 9×9 picture elements in the mode of embodiment) for processing can be calculated to judge as to whether or not the calculated average density value is not more than a predetermined value. When the average density value is not more than the predetermined value, the area can be enlarged to perform conversion into multi-value on the basis of the picture element value within the enlarged area.

The size of each area described above (i.e., 9×9 or 17×17) has been simply described as one of embodiments, and other sizes can be set to each area.

i: Process of highlighted non-edge portion

A description will now be given of a process when S5=1 in Step S111 in FIG. 22, or S4=1 in Step S112 in FIG. 22, i.e., a process in the second highlighted edge detection circuit 522 (See Step S114 in FIG. 22).

An object of the second highlighted edge detection circuit 522 is to judge as to whether or not the edge is detected in the area around the highlighted portion detected in Step S112 of FIG. 22, and to judge as to whether or not the edge is detected in the area (i.e., the area of 9×9 picture elements) set to be smaller than the area of 17×17 picture elements, when the area of 17×17 picture elements is judged to be the most highlighted edge portion in Step S111 in FIG. 22.

Figure 40:
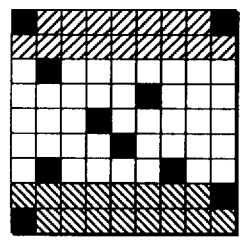
FIG. 40 is a view showing a case of applying the filter shown in FIG. 21 to the picture elements shown in FIG. 35.
Figure 41:
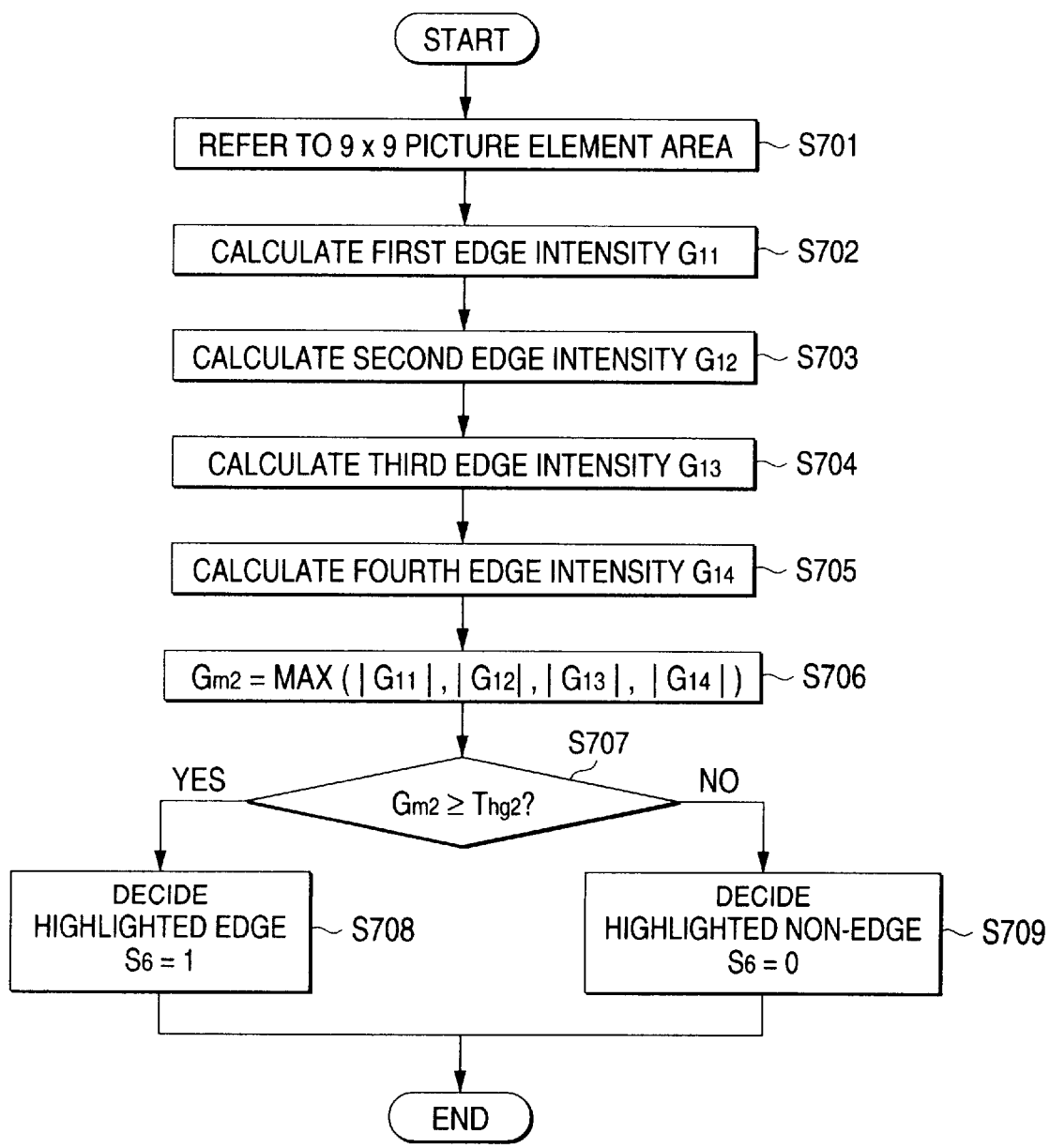
FIG. 41 is a flow chart for explaining the operation of the second highlighted edge detection circuit in the image processing system.

Specifically, the edge is detected using four kinds of filter patterns shown in FIG. 21. A description will now be given of the procedure of edge detection with reference to FIGS. 35 and 40 and also according to a flow chart in FIG. 41.

Now, assuming that a set of candidate picture elements for edge detection is in a status shown in FIG. 35(b), the candidate picture elements for processing are judged to be the highlighted portion. When the filter shown in FIG. 21(a) is applied to the picture elements in the area of 9×9 picture elements shown in FIG. 35(b) (See Step S701 in FIG. 41), the edge intensity (i.e., an absolute value) of the central picture element for processing is found as $|G11|=0$ (See FIG. 40 and Step S702 in FIG. 41). Similarly, when the filters shown in FIGS. 21(b) to 21(d) are used for operation, the edge intensities (i.e., absolute values) are found as $|G12|=2$, $|G13|=1$ and $|G14|=1$ (See Steps S703 to S705 in FIG. 39). Subsequently, the edge intensities $|G11|$ to $|G14|$ thus obtained are used to find the maximum value among $|G11|$ to $|G14|$, and the resultant maximum value is outputted as Gm2 (Step S706). Then the edge is judged using the following mathematical expression (9) (Step S706). Namely, when the maximum value Gm2 satisfies the mathematical expression (9), candidate picture elements for processing are judged to be the highlighted edge portion, and the signal value S6 is outputted as "1" (Step S703). On the other hand, when the maximum value Gm2 does not satisfy the mathematical expression (9), the candidate picture elements for processing are judged to be the non-highlighted portion, and the signal value s6 is outputted as "0".

$$Gm2 \geq Thg2 \tag{9}$$

(wherein Thg2 represents a predetermined threshold value, and is defined as 10 in the mode of embodiment)

Therefore, in case of the above embodiment, since Gm2 is found as $Gm2=|G12|=2$, and therefore, does not satisfy the mathematical expression (9). Thus, the candidate picture elements for processing are judged to be the non-highlighted edge portion, and the signal value S6 is outputted as "0".

The operation of the second highlighted edge detection circuit 522 is performed as described above. Similar to the first highlighted edge detection circuit 521, other-sized filters or a well-known edge detection filter enabling the similar process can be used in the second highlighted edge detection circuit 522. Incidentally, when a low-tone image such as ternary or quadri-valued image is converted into a multi-value image, the similar process is made possible by performing operation on the basis of the average density value of picture elements within the edge area (i.e., the number of white or black picture elements can be also used substantially similarly).

j: Process of highlighted edge portion

A description will now be given of a finishing process when S6=0, i.e., a process of the fourth circuit for conversion into multi-value. The concept of this process is basically similar to the process in Step S117 in FIG. 22. Namely, since the candidate picture elements for processing are judged to be the highlighted non-edge portion within the range of the area of 9×9 picture elements, the picture elements within the area of 9×9 picture elements are considered to be noise peculiar to the error-diffused picture elements and then smoothed for removing the noise. The smoothing process is performed simply using a window of 9×9 size. Subsequently, the resultant value is normalized using the mathematical expression (3), and the resultant value is outputted as the signal Sc4. As is analogized with ease, other-sized windows or other well-known noise removal filters can be also used for smoothing.

On the other hand, when S6=1, the edge is detected in the range of the area of 9×9 picture elements around the candidate picture elements for processing, and therefore, the process in the third circuit 4 for conversion into multi-value is performed (See Step S113 in FIG. 22). Namely, the candidate picture elements for processing are smoothed using the weighted filter shown in FIG. 10. As described above, if the filter of 5×5 size is used for smoothing, it is possible to perform conversion into a multi-value of high quality without defacing the highlighted edge portion at the edge of the area of 9×9 picture elements.

After the above processes, an M-valued (M=256) image is outputted through the resolution conversion unit 206 to the printing unit 207. As described above, according to the image processing system of the present invention, a process of conversion into multi-value suitable for the candidate picture elements for processing is performed in accordance with the degree of brightness of highlight, while detecting the edge. Thus, it is possible to convert the candidate picture elements for processing into a multi-value image of higher image quality.

The circuit 946 for conversion into multi-value is similar in operation to the circuit 947 for conversion into multi-value as described above. However, in the circuit 946, since the size of the image memory or the size of the filter in each of the highlight detection process, the highlighted edge detection process and an accompanying process for conversion into multi-value are set to be appropriately smaller than those of the circuit 947, the process in the circuit 946 for conversion into multi-value is performed correspondingly to the appropriately smaller image memory or filter size.

Since one of the circuits 946 and 947 for conversion into multi-value is selected according to the resolution of an input image, the process according to the resolution is performed. The circuits 946 and 947 can be switched over under control of the control unit 201 by recognizing the resolution from the transfer mode signal transferred through the modem 202.

In the mode of embodiment, the second highlighted edge detection circuit 522 detects the edge using a predetermined pattern. However, the edge can be detected on the basis of the number of white or black picture elements (only in case of binary image data). Further, in converted into multi-value, the binary image data can be converted into multi-valued data on the basis of the ratio of white or black picture elements in the reduced area.

When the low-tone picture elements such as ternary or quadri-valued image are converted into a multi-value image, it is possible to easily process such low-tone picture elements by making a judgment on the basis of the average density, instead of the number of black picture elements used in case of the binary image data. In this case, other processes attendant on such low-tone picture elements for conversion into multi-value can be appropriately set.

In the mode of embodiment described above, the size of the area for conversion into multi-value in the circuit for conversion into multi-value is varied. Otherwise, a method of conversion into multi-value can be varied with each circuit for conversion into multi-value. In this case, the circuit for performing the method of conversion into multi-value suitably for the resolution of an input image is selected as the circuit for conversion into multi-value. Similarly, a plurality of circuits for conversion into multi-value partially different from one another in area, method or process for conversion into multi-value can be provided to select one circuit for conversion into multi-value suitably for the resolution of an input image.

What is claimed is:

1. An image processing system, comprising:

a plurality of separate converting units for converting an input N-valued (N≧2) image into an M-valued (M>N) image;

recognizing means for recognizing a spatial resolution of said input N-valued image; and selecting means for selecting one of said converting units according to the spatial resolution recognized by said recognizing means, wherein each of said converting units executes a conversion process based on an analysis of picture elements within a predetermined area centering around candidate picture elements for processing; the size of said predetermined area varies with each converting unit; and said selecting means selects the converting unit such that said predetermined area is smaller as the spatial resolution of the input N-valued image is lowered.

2. An image processing system, comprising:

converting means for converting an input N-valued (N≧2) image into an M-valued (M>N) image;

recognizing means for recognizing the spatial resolution of said input N-valued image;

variable magnification means for varying the magnification of an image; and variable magnification control means for: (1) varying the magnification of said input N-valued image with said variable magnification means when the spatial resolution recognized by said recognizing means is not more than a predetermined value, and for (2) varying the magnification of the M-valued image output from said converting means with said variable magnification means without first varying the magnification of said input N-valued image when the spatial resolution recognized by said recognizing means exceeds the predetermined value.

3. An image processing system according to claim 1, further comprising:

variable magnification means for varying the magnification of an image; and variable magnification control means for alternatively varying the magnification of said input N-valued image with said variable magnification means when the spatial resolution recognized by said recognizing means is not more than a predetermined value, and varying the magnification of the M-valued image, which is outputted from said converting unit, with said variable magnification means when the spatial resolution recognized by said recognizing means exceeds the predetermined value.

4. An image processing system according to claim 1, wherein said input N-valued image is an image transferred from a facsimile apparatus, and said recognizing means recognizes the spatial resolution according to a signal transferred from the facsimile apparatus as a signal representing a transfer mode.

5. An image processing system according to claim 2, wherein said input N-valued image is an image transferred from a facsimile apparatus, and said recognizing means recognizes the spatial resolution according to a signal transferred from the facsimile apparatus as a signal representing a transfer mode.

6. An image processing system according to claim 1, further comprising:

data expansion means for expanding a compressed image transferred from a facsimile apparatus;

wherein the output of said data expansion means is used as said input N-valued image.

7. An image processing system according to claim 2, further comprising:

data expansion means for expanding a compressed image transferred from a facsimile apparatus;

wherein the output of said data expansion means is used as said input N-valued image.

8. An image processing method comprising the steps of:

inputting an input N-valued (N≧2) image;

recognizing a spatial resolution of said input N-valued image;

selecting one of a plurality of separate converting units for converting said input N-valued image into an M-valued (M>N) image according to the recognized spatial resolution; and converting said input N-valued image into said M-valued image by said selected converting unit, wherein said converting step executes a conversion process based on an analysis of picture elements within a predetermined area centering around candidate picture elements for processing: the size of said predetermined area varies with each converting unit; and said selecting step selects the converting unit such that said predetermined area is smaller as the spatial resolution of the input N-valued image is lowered.

9. An image processing system according to claim 1, wherein each said converting unit comprises a plurality of conversion circuits, said circuits being different from one another in arithmetic operating method.

10. An image processing system according to claim 2, wherein said converting means comprises a plurality of conversion circuits, said circuits being different from one another in arithmetic operating method.

11. An image processing method according to claim 8, wherein the selected converting unit converts the input image using a plurality of conversion circuits, said circuits being different from one another in arithmetic operating method.

12. An image processing method for converting an input N-valued (N≧2) image into an M-valued (M>N) image, the method comprising the steps of:

recognizing the spatial resolution of said input N-valued image;

varying the magnification of said input N-valued image when the recognized spatial resolution is not more than a predetermined value; and varying the magnification of the output M-valued image, without first varying the magnification of said input N-valued image, when the recognized spatial resolution exceeds the predetermined value.

13. An image processing method according to claim 12, wherein said input N-valued image is an image transferred from a facsimile apparatus, and said recognizing step recognizes the spatial resolution according to a transfer mode signal transferred from the facsimile apparatus.

14. An image processing method according to claim 13, further comprising the step of:

expanding a compressed image transferred from a facsimile apparatus to form said input N-valued image.

* * * * *